(12) United States Patent
Appalabattula et al.

(10) Patent No.: US 9,485,210 B2
(45) Date of Patent: Nov. 1, 2016

(54) SYSTEMS AND METHODS FOR SOCIAL PARENTING PLATFORM AND NETWORK

(71) Applicant: Bloomz, Inc., Redmond, WA (US)

(72) Inventors: Chakrapani Appalabattula, Redmond, WA (US); Sarath Jyothsna Appalabattula, Redmond, WA (US); Ashok Meyyappan, Issaquah, WA (US); Edmund Yu, Kirkland, WA (US)

(73) Assignee: Bloomz, Inc., Redmond, WA (US)

( * ) Notice: Subject to any disclaimer, the term of this patent is extended or adjusted under 35 U.S.C. 154(b) by 0 days.

(21) Appl. No.: 14/469,401

(22) Filed: Aug. 26, 2014

(65) Prior Publication Data

US 2015/0067879 A1 Mar. 5, 2015

Related U.S. Application Data

(60) Provisional application No. 61/870,242, filed on Aug. 27, 2013.

(51) Int. Cl.
| | |
|---|---|
| H04L 29/06 | (2006.01) |
| H04L 12/58 | (2006.01) |
| G06Q 50/00 | (2012.01) |
| G06Q 10/10 | (2012.01) |
| G06Q 30/06 | (2012.01) |
| G06F 17/30 | (2006.01) |

(52) U.S. Cl.
CPC ............... *H04L 51/32* (2013.01); *G06Q 10/10* (2013.01); *G06Q 50/01* (2013.01); *H04L 63/10* (2013.01); *G06F 17/3053* (2013.01); *G06Q 30/0631* (2013.01)

(58) Field of Classification Search
CPC .................. G06F 17/3053; G06Q 30/0631

USPC .................................................. 726/26
See application file for complete search history.

(56) References Cited

U.S. PATENT DOCUMENTS

| | | | |
|---|---|---|---|
| 2003/0134261 A1* | 7/2003 | Jennen et al. ............... 434/354 |
| 2008/0052203 A1* | 2/2008 | Beyer et al. .................. 705/28 |
| 2008/0187893 A1* | 8/2008 | Blaustein ............... G09B 7/02 434/236 |
| 2008/0215607 A1* | 9/2008 | Kaushansky et al. ........ 707/102 |
| 2009/0035733 A1* | 2/2009 | Meitar et al. ................ 434/118 |
| 2010/0136949 A1* | 6/2010 | Bira et al. .................... 455/410 |
| 2011/0010306 A1* | 1/2011 | Gonzalez et al. ............ 705/326 |
| 2011/0209192 A1* | 8/2011 | LeClerc Greer et al. ........ 726/1 |
| 2012/0301855 A1* | 11/2012 | Hollaar et al. ............... 434/238 |
| 2014/0114965 A1* | 4/2014 | Balduzzi ........... G06F 17/30867 707/723 |
| 2014/0222806 A1* | 8/2014 | Carbonell et al. ............ 707/732 |
| 2014/0344182 A1* | 11/2014 | Kapoor ................... G09B 7/00 705/347 |
| 2014/0344219 A1* | 11/2014 | Kapoor ................... G09B 7/02 707/609 |
| 2014/0351269 A1* | 11/2014 | Kapoor ................... G09B 7/00 707/748 |

* cited by examiner

*Primary Examiner* — Carl Colin
*Assistant Examiner* — Gary Lavelle
(74) *Attorney, Agent, or Firm* — Brooks Kushman P.C.

(57) ABSTRACT

A parent social network based on relationship of children, including of activities, needs, interests or combinations thereof, is described. The parent social network can identify at least two minors with a common activity, need, interest or combination thereof, identify an adult responsible for the identified minors; and propose to link the identified adults. The parent social network can also provide post and other data to a parent based on interests and activities of a child. The parent social network can also identify and subscribe the parent to relevant children related calendars. The parent social network can allow effective communication between relevant parents using messaging and other means.

19 Claims, 28 Drawing Sheets

FIG. 13G  CIRCLES (PERSONAL & ACTIVITY)

FIG. 13H  EMPHASIS ON BUILDING NETWORK

FIG. 13I  INVITING BLOOMZ FRIENDS

FIG. 15A — CALENDAR MAIN PAGE

FIG. 15B — INVITATION DETAIL PAGE

FIG. 15C — FILTERED TO ONE CHILD

*FIG. 15G*  *FIG. 15H*  *FIG. 15I*

FIG. 16D — CLASS CIRCLES AUTO CREATED

COMPLETE YOUR PROFILE   DONE

ADD PHOTO

REMOND ELEMENTARY TEACHER
[FEMALE] / MALE

CREATE CLASS CIRCLES

USE CLASS CIRCLES TO MANAGE COMMUNICATIONS AND COLLABORATE WITH PARENTS TO HELP STUDENT SUCCEED

CLICK A CLASS BELOW TO EDIT CLASS NAME AND ADD PARENTS

CO-WORKERS   CLASS1   CLASS2   CLASS3   NEW CIRCLE

FIG. 16E — INVITE CLASS PARENTS

<CANCEL   EDIT CIRCLE   SAVE

CIRCLE NAME       CLASS1
DESCRIPTION
GRADE
SUBJECT                    ADD SUBJECT
CO-TEACHER             ADD CO-TEACHER
STUDENT (0)

STUDENT FIRST NAME | LAST NAME
PARENT EMAIL ADDRESS

FIG. 16F — CO-WORKERS CIRCLE

<BACK

ADD FROM: REDMOND ELEMEN...
SUGGESTED | VIEW ALL

CO-WORKERS
NEW CIRCLE

ALDER, BECKY — TEACHER
ANDERSON, BLAIR — TEACHER
APPLEGATE, JACK — COACH
BOK, PEI — TEACHER
BROCK, CONNIE — TEACHER
CARTER, KIMBERLY — COACH

SYSTEMS AND METHODS FOR SOCIAL PARENTING PLATFORM AND NETWORK

RELATED APPLICATION

The present application claims benefit of U.S. Patent Application No. 61/870,242, titled Systems and Methods for Social Parenting Platform and Network, filing date 27 Aug. 2013, which is hereby incorporated by reference for any purpose.

TECHNICAL FIELD

This disclosure relates to the field of social networks, and in particular to a social network systems and methods for adults responsible for minors.

BACKGROUND

Parents/caregivers are typically busy and so are the children they provide for, which raises the question of how to effectively connect the parents/caregivers with the world around their children, and reduce the stress on the busy parents/caregivers thereby ensuring their children thrive. Demanding jobs require long hours that negatively impacts available family time. The intentions are always to bring about the best for a child which necessitates reliance on others for adequate support in this effort. There are no social networks that focus on the "purpose of parenting" or on the needs of parents, caregivers, families, etc. Current systems/networks are based on the parent's own personal connections while relying on unrelated online networks/tools for collaboration. They don't enable connecting parents with other parents based on their child's social group, school or activity. This can be a larger problem when parents are divorced, deceased or no longer an active participant in a specific aspect of the child's life. In addition, adults may not wish to co-mingle the parents of their child's friends and acquaintances with their personal social network, e.g., Facebook or Google Hangouts, or their professional network, e.g., LinkedIn.

SUMMARY

A social network for parents is described. The social network connects parents and legal guardians based on their children's and minors connections at school and other activity centers. The social network can include a social parenting system including a social network machine including at least one of activities, needs, interests or combinations thereof of minors; and a processor in communication with the social network machine. The processor can be configured to identify at least two minors with a common activity, need, interest or combination thereof, identify an adult responsible for the identified minors, and propose to link the identified adults.

In an example, the social network machine includes minor identifying information and wherein the processor is configured to hide child identifying information from the identified adults and to identify the common activity, need, interest or combination thereof with the proposed link.

In an example, the processor is configured to identify different circles of responsible adults for different common activities, needs, interests, combinations thereof and children when the adult is responsible for more than one child.

In an example, the responsible adult includes at least one of a parent, a guardian, a teacher, a coach, a care provider, an activity provider or a school administrator.

In an example, the at least one of activities, needs, interests or combinations thereof of minors includes at least one of a sports team, a classroom, a grade level, a school organization, a school, an address, a daycare center, an activity center, a medical need, a daycare, In an example, the processor is configured to link the identified adults on the social network machine upon receiving an approval from the identified adults and configured to feed notices to the linked adults regarding the identified common activity, need, interest or combination thereof. In an example the adults can connect and collaborate through circles and groups as well as or in place of direct one-to-one connections with other adults.

In an example, the processor is configured to feed trusted notices to the linked adults regarding the identified common activity, need, interest or combination thereof and wherein the trusted notices are stored in a memory of the social network machine using recommendation of other adults.

In an example, the social network machine communicates with the adults through a home page associated with the adults, email, instant messaging, texting, phone call, or combinations thereof.

BRIEF DESCRIPTION OF THE DRAWINGS

FIGS. 13A-13O show steps in the first run experience for an adult joining the social network.

FIGS. 15A-15I show steps in a calendar process in the social network.

FIGS. 16A-16I show steps in a teacher experience in the social network.

DETAILED DESCRIPTION

Figure 1:
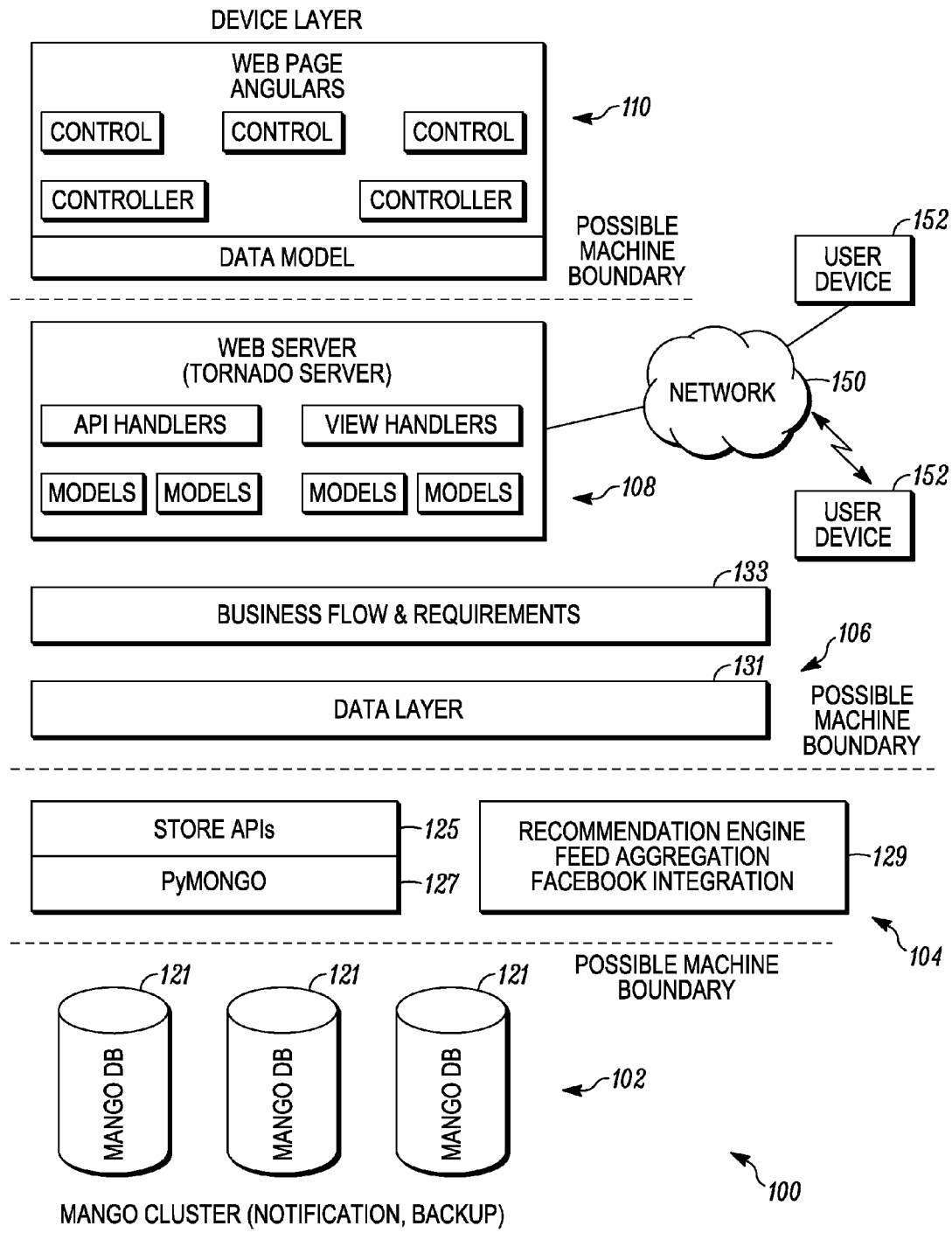
FIG. 1 shows a schematic diagram of system that can perform the methods and functions according to various embodiments.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As an overview, the presently described systems and methods for a social parenting platform (currently being developed under the trademark "Bloomz") can allow parents to help their children reach their fullest potential by enabling them to make informed decisions based on the ecosystem around the activities, needs and/or interests of their children. The social parenting platform connects parents through their children's ecosystem in order to build a thriving community. A mobile device and/or computer based parenting platform is provided that enables a parent to connect with other "appropriate" parents, caregivers, coaches, activity directors, and teachers enabling the child to flourish and simplify the life of parents. The present description uses the term "parent" throughout. It will be understood that parent is defined broadly to include any adult responsible for a child, e.g., a biological parent, an adoptive parent, a foster care provider, a guardian, a person designated by a court or other governmental agency to be responsible for a child, and relationships of similar import.

Adults responsible for children (e.g., parents, guardians, and caregivers) are typically busy and so are the children for who they are responsible. This raises the question of how to reduce the stress on the busy responsible adults thereby ensuring families flourish without impacting the child's ability to thrive. Many adults work demanding jobs which can require long hours or hours outside the historical 9-5 workday, which negatively impacts available family time and time to organize a child's activities. Adult intentions are always to bring about the best for a child which necessitates reliance on others for adequate support in this effort in modern life. Consequently, responsible adults find it difficult to make trusted connections with other parents in their child's ecosystem and need a platform that facilitates easy discovery of other parents and promotes collaboration among parents. Currently systems/networks are based on personal connections while relying on unrelated online networks/tools to find relationships. These networks are deficient in that they are designed at best to only collaborate with other parents that a parent already knows and therefore such networks are extremely limited without visibility to "unknown" net-world resources that may be exist. Additionally, such systems/networks are not fully used as they lack parenting and child development focus and rely partially on other social networks, such as Facebook, or emails that are suboptimal and/or generic in nature, unlike the present system and methods. Traditional social networks are deficient in this area as many adults are reluctant to share their child's information on these networks. Still further some social network users prefer to keep their social networks dedicated to one group, e.g., Facebook for friends outside of work, LinkedIn for business contacts, etc.

Systems and methods described herein will facilitate discovery and promote collaboration among parents, activity centers, schools, teams and service providers related to minors. Systems and methods described herein relate to parenting and focuses on children while allowing parents to tap into collective intelligence through the ecosystem created using the social parenting platform. Systems and methods described herein provide for a personalized, contextual, trusted, secure, safe, actionable, vetted and accessible platform and network such that parents can rely on their network in the social parenting platform for making informed decisions. The parent social network actively engages parents with the community associated with their children and lets them discover valuable parent connections and parenting resources that they would otherwise miss. It can also consolidate communications and tools to simplify daily life.

In an embodiment, a mobile device and/or computer based parenting platform/network is provided that enables a parent to connect with other "applicable" parents and teachers enabling the child to flourish and simplifying the life of parents. In an embodiment, a mobile device and/or computer based parenting platform that enables a parent discover "applicable" resources to help enrich their children and to enable better parenting. In yet another embodiment, a mobile device and/or computer based parenting platform is provided that enables intelligent and informed parenting using any one or combinations of the methods and/or systems described herein.

Activity-based parent networks are transient networks that are driven by the activities in which their children participate. These are transient as the child grows and changes interests. For example, a parent network based on a child's classroom will change every year. A parent network based on a child's activity changes with the participation of the child. It is not uncommon for a child to be involved in dance for a few months and thereafter switch to and a sports team, e.g., basketball, and thereafter switch to an academic event, e.g., science olympiad. There are very few systems/tools that help parents flourish with these kinds of networks. Since traditional social networks depend solely on parents' existing social network (which is generic and limited), they lack insight into the kids overall development.

The present inventors have heard parents say "I wish I had more time for my kids!" Parents today are very busy and have limited time to dedicate to parenting, especially, the planning and logistics involved with their kid's activities, school, et. The present inventors have identified a need for systems and methods to provide parents with "help" to optimize that time. Besides the time issue, the next difficulty they find is the means to tap into the collective parental intelligence & parental experience in a trusted and reliable manner. Note that tapping into the intelligence and experience of the personal friends/family network is relatively easier; however, there is a vast pool of unknown parents and the knowledge that lies with them is extremely powerful and could be useful to other parents. This is a part that parents are missing out on today as no prior social network delivers these features.

Likewise, there is a lot of data that is available, but very little useful, relevant information. Parents have to mine through to find the information that is relevant and specific to them. Having busy lives, parents crave for help from others (e.g., a community) whom they can trust for parenting chores such as pickup and drop-off. They often are in a situation of "Who do I contact?" or "Where is the help when I need it?" Their contacts are scattered across several information islands such as phone, email applications, texting, mailing lists, Facebook, Linkedin, messaging/chat applications such as WhatsApp, Blackberry Messenger, Google Chat, viber etc. They want to do all of the above, however in a secure environment, which currently is not available.

The present inventors have also identified a need by schools and other children's activity centers for a social networking solution. Schools are reluctant to get involved directly due to their responsibilities to protect children as the in locus parentis and the requirement to secure data of minors, e.g., Child Online Protection Act and the Data Protection Act. School-based parent networks are also transient networks that may be driven by schools but have been found to be an ineffective collaboration tool which has led to limited participation. The parent, teacher groups (e.g., PTA, PTO, PA, etc.) rely on tools and distribution lists either generated by the school or active parents. As useful as they might be, there are several limitations including, but not limited to the following. Such tools and lists are still not personal enough to increase parent collaboration and a lack of online discovery on demand takes extra effort for networking between parents. Moreover, such tools and lists do not identify related resources. For example, directory list for a kindergarten class may provide names, emails and phone numbers. However, if a parent is considering changing pedestrians, there is no good may to pose this to the group or receive a recommendation. As another example, a parent wishes to organize an end of year gift for the teacher but lost the paper directory. With a social network, this parent can login and contact the circle associated with the class (minus the teacher of course).

A further problem is that school networks are not easy to use. The information is not provided in a user friendly manner. The data may not be timely and focused. The parents must then mine the network for information that's relevant to them. As a result, the prior school networks are not efficient, not lively and exciting enough to get the parents engaged. Many school networks are mere email interfaces, i.e., the network has limited abilities—not much can accomplished with just email. There is a lot more to make "collaboration" work. User desire more from a network to engage the user and achieve a critical mass of users and useful content.

Schools realize that parental engagement is critical to children's success; however they are struggling to achieve this. There are several drawbacks to current systems.
  a. Communication: Best tool most schools and class teachers have to communicate with parents is email.
  b. From parents perspective information relevant to them is hidden in the weekly newsletter. In order to find the information relevant to them, parents have to plough through and decipher this data. As much as this is a pain point for the parents, the schools and teachers also lose due to inability to effectively communicate relevant information to the parents.
  c. Likewise teachers don't have a simple and live tool to stay connected with the parents. Email simply isn't that effective. There is a lot more required for teacher-parent collaboration.

Consequently, the present inventors have identified that there is a need for a social network or system for parents that is developed around their children and their activities. Parents need a network that is personalized, contextual, trusted, secure, safe, actionable, vetted and accessible where parents can rely on their network for making informed decisions.

In an embodiment, a social parenting platform is provided that helps parents make the best decisions for their kids, by using the power of trusted collective intelligence and experience from a personalized secure extensive parent network, and by providing data driven recommendations on activities and advices that help their kids reach their full potential.

In an embodiment, the social network or system provides a virtual parenting ecosystem. In an embodiment, the social network or system provides a personalized platform that is reimagined to connect parents through their children's' networks in order to build a thriving community. In an embodiment, the social network or system provides trusted, collective parental intelligence, and experience of other parents in the network and is readily available on mobile devices as well as on desktops/laptops. In an embodiment, the social network or system actively engages with the community and enables discovering and sharing. In an embodiment, the social network or system consolidates communications and tools to simply daily life of parents.

FIG. 1 shows a parent social-network system 100, which can include a database layer 102, an instruction/processing layer 104, a business engine layer 106, a network server layer 108, and a device layer 107. Each of these layers 102-110 can include circuitry for performing various functions as described herein. Examples of the circuitry include controllers, memory, processors, etc. These various layers can be computing machines, e.g., machines described below with regard to FIG. 20. The layers 102-110 can be physically connected together and/or electrically connected together to enable communication between the layers. In some embodiments, the various layers or circuitry of the layers are not at the same physical location and can be distributed, e.g., over a local communication network or over a global communication network, e.g., the Internet or web.

The database layer 102 can include machines, e.g., data storage devices 121, which store electronic, magnetic or optical data. The data storage devices 121 can form a Mango cluster with redundancy, replication, mirroring, and backup of the data. The data stored on the devices 121 can be all information described herein with regard to children and parents and the functions of the parent social network ("PSN"). A storage device 121 may hold information, process information, or both. A device that only holds information is a recording medium, which can be electronic, magnetic or optical. Electronic data storage requires electrical power to store and retrieve that data. Electromagnetic data may be stored in either an analog data or digital data format on a variety of media. The devices 121 can electronically encode the data. The devices 121 can include semiconductor devices or integrated circuits to electronically store data. The devices 121 can include optical or magnetic tape to store the data. The devices 121 can include optical or magnetic disks to store the data. The media on which the devices 121 store the data can be either non-volatile storage (data remains if no power to the device) or volatile (data is only valid if device is powered).

The instruction layer 104 can include memory to store instructions for execution by the PSN 100 and processing circuitry to execute the instructions in the PSN 100. The instruction layer 104 can include memory that is similar to database layer 102 but such instruction layer memory can be dedicated to instructions and may not store parent or child data other than temporarily when executing an instruction. Instruction layer 104 can store application program interfaces 125, database interface instructions 127 and processing circuitry 129. The processing circuitry when loaded with instructions is dedicated circuitry to performing functions of the PSN. Processing circuitry 129 can operate to provide recommendations as described herein, to suggest connections to parents based on a data relating to children and those children's relationships. Processing circuitry 129 can execute instructions to create feeds of posts and other information to a specific parent on the PSN. This data can be sent to a parent's device from the processing circuitry or through other layers of the PSN. Processing circuitry 129 can also execute instructions to pull information from other social networks regarding any individual parent on the PSN.

The business engine layer 106 can include memory to store business instructions for execution by the PSN 100 and processing circuitry to execute the business instructions in the PSN 100. Business engine layer 106 can include a data layer 131 that stores business level data that relates to generating revenue based on operation of the PSN and an engine 133 that uses the data in data layer 131 to perform business rules on the data being generated by the PSN to account for revenue owed to the PSN and in some embodiments account for amounts owed to external systems.

The web server layer 108 can include memory to store communication network instructions for execution by the PSN 100 and processing circuitry to execute the communication network instructions in the PSN 100. In an example, the web server layer can include a Tornado server that has hardware (e.g., a computer) and the software (e.g., instructions) that delivers web content that can be accessed through a global computer network, e.g., the Internet, or to a local computer network. The web server layer 108 can store, process and deliver web pages to client devices, e.g., parent devices. The communication between client device and server can use Hypertext Transfer Protocol (HTTP). Pages delivered by the web layer can be HTML documents, which may include images, style sheets and scripts in addition to text content. The web server layer 108 can include API handlers, view handlers and models for both handlers.

The device layer 110 can include memory to store device level instructions for execution by the PSN 100 and processing circuitry to execute the device level instructions in the PSN 100. The device layer 110 can alter the web page data based on the type, abilities and settings of individual user devices. This assists in creating a satisfying environment for the parent users. Various control parameters and data models are used by controllers to adjust the content sent to a user from the PSN.

PSN 100 communicates through a network 150 to user devices 152. The user devices can be used by parents to access their profiles and data on the PSN. The user devices 152 can have a wired connection to the network 150 or a wireless connection to the network 150. The user devices 152 can also receive data from the layers 108, 110 that was processes using instruction of methods described herein by layers 102, 104 and 106, which can include data that is the result of processes described herein with regard to the parent social network, including, but not limited to, verification, signup, circle interaction, community interaction, posting, pinning, volunteer requests, recommendation of connections, etc. Examples of user devices include, but are not limited to, phone, smartphone, tablet, laptop, computer, personal data assistant, internet of all things device, a set-top box, a cable TV box, a television or other electronic communication device.

Figure 2:
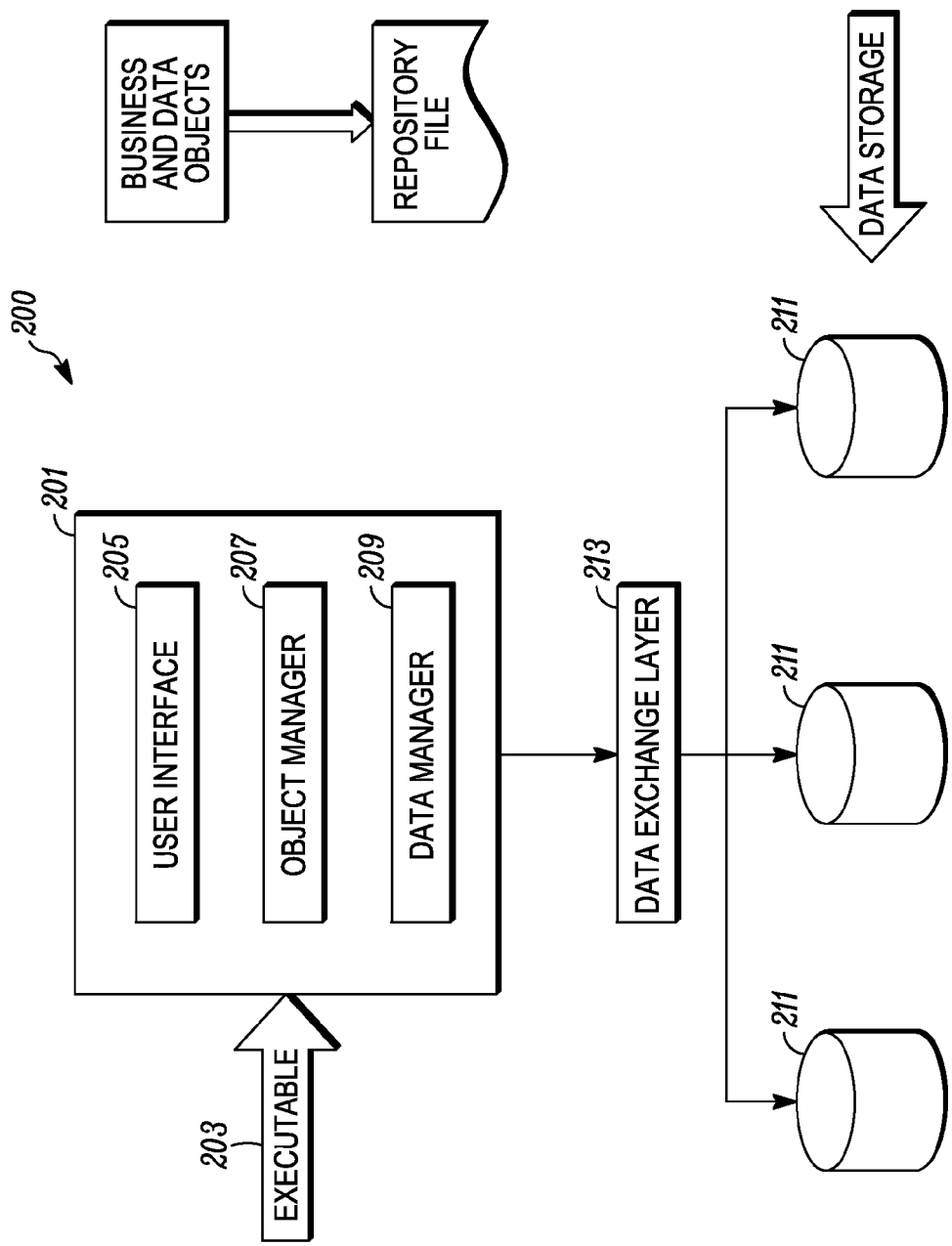
FIG. 2 shows a schematic diagram of system that can perform the methods and functions according to various embodiments.

FIG. 2 shows a parent social-network system 200. A processor or processing circuitry 201 is loaded with executable code, instructions or software, 203 and becomes a dedicated machine for performing those instructions. The processing circuitry 201 can operate as a user interface 205, an object manager 207 and/or a data manager 209. The processing circuitry 201 can include a single processor or a plurality of processor that can be in a single location or distributed over a network. The data manager 209 communicates with data storage servers 211 through a data exchange layer 213. The data exchange layer 213 includes memory controllers that can execute read and write requests to and from the memory servers 211. The object manager 102 can create business and data objects that can be stored in databases 211 as a repository file, which is different than user data.

Figure 3:
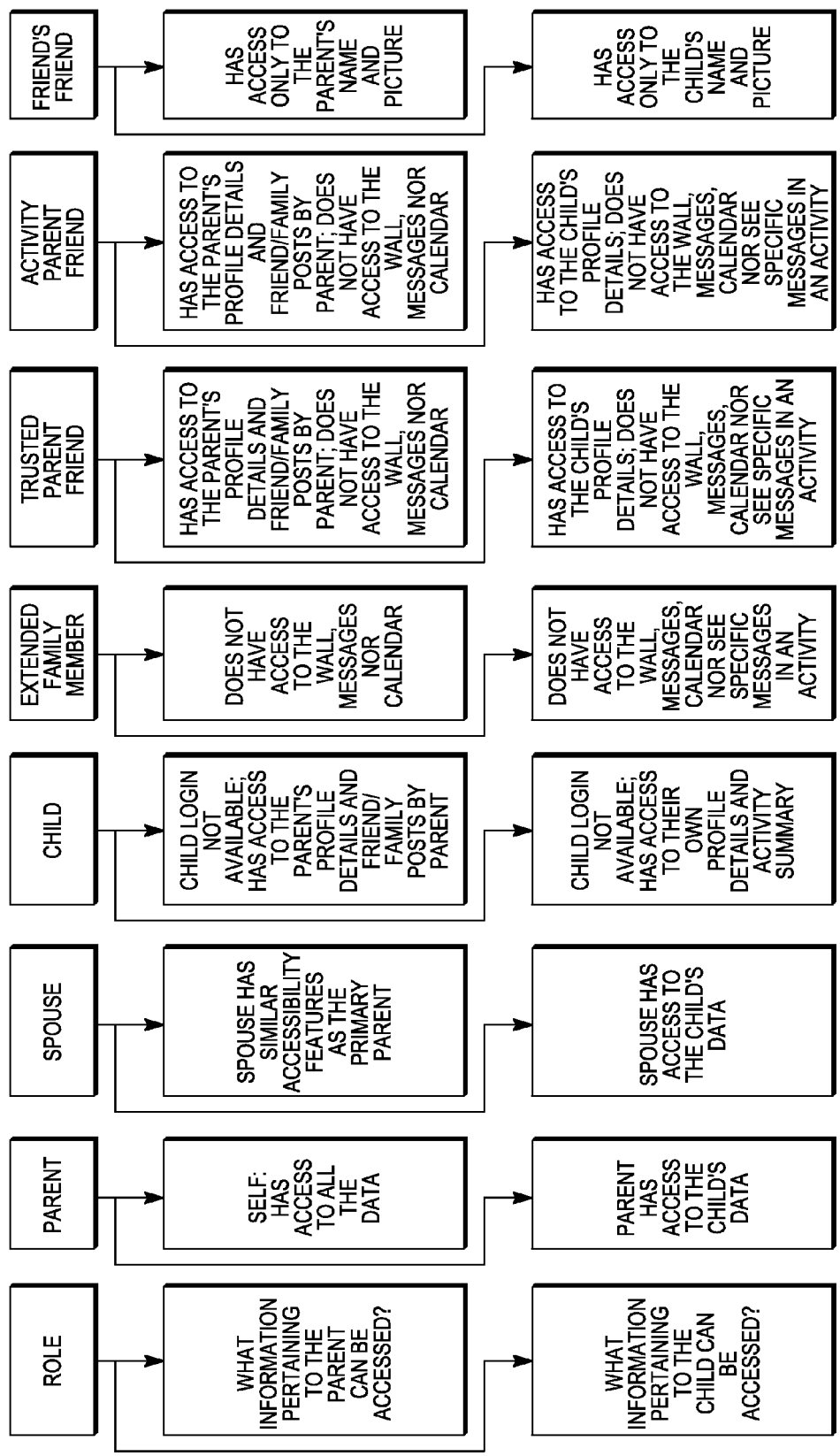
FIG. 3 shows a schematic of role restrictions that can be implemented in the systems and methods according to various embodiments.

FIG. 3 shows roles 300 that can be assigned in the parent social network. The table shown in FIG. 3 describes the actor in the PSN, information that can be accessed and child information that can be accessed. The parent, who can be verified as described herein, has access to all data regarding self and all data regarding his/her child. The spouse of a parent has similar access. The spouse can be restricted in the PSN from the parent data or the child data if such a restriction is required, e.g., by court order, separation or divorce. A child does not have a direct, person login into the PSN. A child who wishes to access the PSN must access the PSN through their parent's account. The parent and spouse have and maintain separate accounts. An extended family member has restricted access and will only see parent or child information when such information is forwarded by the parent user. A trusted, connected parent can have access to the parent profile details but cannot see the feed, some posts, some of the group data of another parent. They will only have access to such data if they are connected either directly or thru a group. Note that parents and their spouse will be automatically connected to other parents and groups based on the spouse's connection in certain scenarios such as school group or school teacher connection. The trusted, connected parent can have access to the child data but not some details, e.g., calendar, feed, posts or specific messages about the child where the conversation was 1-on-1. A group or circle based connection can have access to the parent profile and posts to the activity related posts and feeds. The activity connection can also see posts by the parent's other connections and family. The group based parent can have access to a child's profile only if the parent had permitted access. A connection of a parent's connection has access to another of the parent's connections name and picture only and the same for child profile access. A second level connection, e.g., connection of a connection of a connection has no access to the parent or child data in the PSN.

Figure 4:
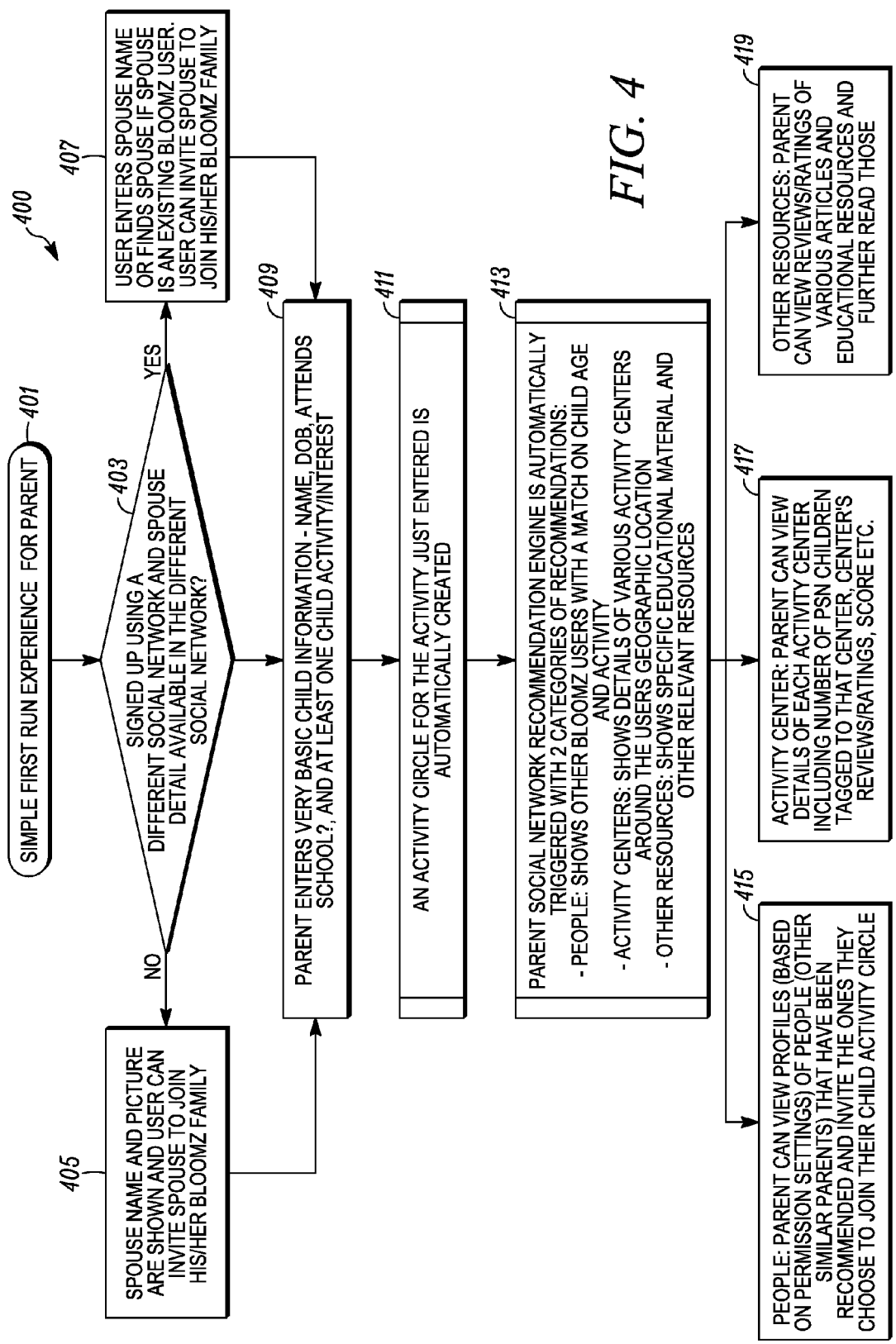
FIG. 4 shows a method flow for a first experience for an adult according to an embodiment.

FIG. 4 shows a method flow 400 for a first experience for an adult according to an embodiment. At 1401, the first time experience for a parent user begins. At 1403, it is determined whether the parent user signs up using another social network and determines whether the spouse or other responsible partner is part of the social network. Examples of a social network include Facebook, LinkedIn, Café Mom, Classmates.com, Google+, Foursquare, Instagram, Pinterest, Tumblr, Twitter, etc. If not, then at 1405 the spouse name and picture are shown and the user can invite the spouse to join and link to user in the parent social network. If yes at 1404, then at 1407 user enters spouse name or finds spouse is an existing parent social network user and invites the spouse to connect, link or join a circle in the parent social network. At 1409, the user enters basic child identifying information, e.g., name, date of birth, school, grade, classroom teacher, activity, or combinations thereof. At 1411, an implicit relationship circle is created in the system. The circle can be based on any of the child identifying information or based on the parent information. The server hosting the system can automatically create the circle(s) when the information is entered.

At 1413, the parent social network launches a recommendation engine. These interactions by a user with the system can be through the user devices, e.g., as shown in FIG. 1. The recommendation engine can be automatically triggered by three or more categories of recommendations. A people category can match parents in the social network based on the matching data regarding children, e.g., age, activity, school, etc. An activity center category can match parents in the social network based on children activity and the user's geographic location. The other category can match parents based on additional information, e.g. specific educational resources, data and other relevant sources.

At 1415, parents can view other parents or adults in the social network that are recommended in step 1413. This can be limited by permission settings of the parents in the system. The parents can set the level of likelihood that the recommendation is strong, likely or weak. The user can review the recommended parents and select which ones to invite to join a circle or join an existing circle.

At 1417, the user can view the details of an activity center, which was recommended in step 1413, including the number and children in the parent social network (PSN) associated with that center. The user can also use the activity center to link to or join circles with parents that have children at that activity center of interest to their children. The user read reviews, comments, ratings, scores, etc. regarding the activity center are provided by the PSN.

At 1419, the user can access the details of the other category, which was recommended in step 1413, including the number and children in the parent social network (PSN) associated with that recommended other category. The user can also use the other category to link to or join circles with parents that have children at that activity center of interest to their children. The user read reviews, comments, ratings, scores, etc. regarding the activity center are provided by the PSN.

The user devices 152 can receive data from the layers 108, 110 that was processed using instructions of methods described herein with reference to FIG. 4, e.g., for enrolling parents and providing recommendations. The processing can be performed, at least in part, by layers 102, 104 and 106. The user devices 152 can also send input from parents to the layers 108, 110 for further processing in layers 102, 104 and 106. In some examples, some instructions are carried out on the user devices 152.

Figure 5:
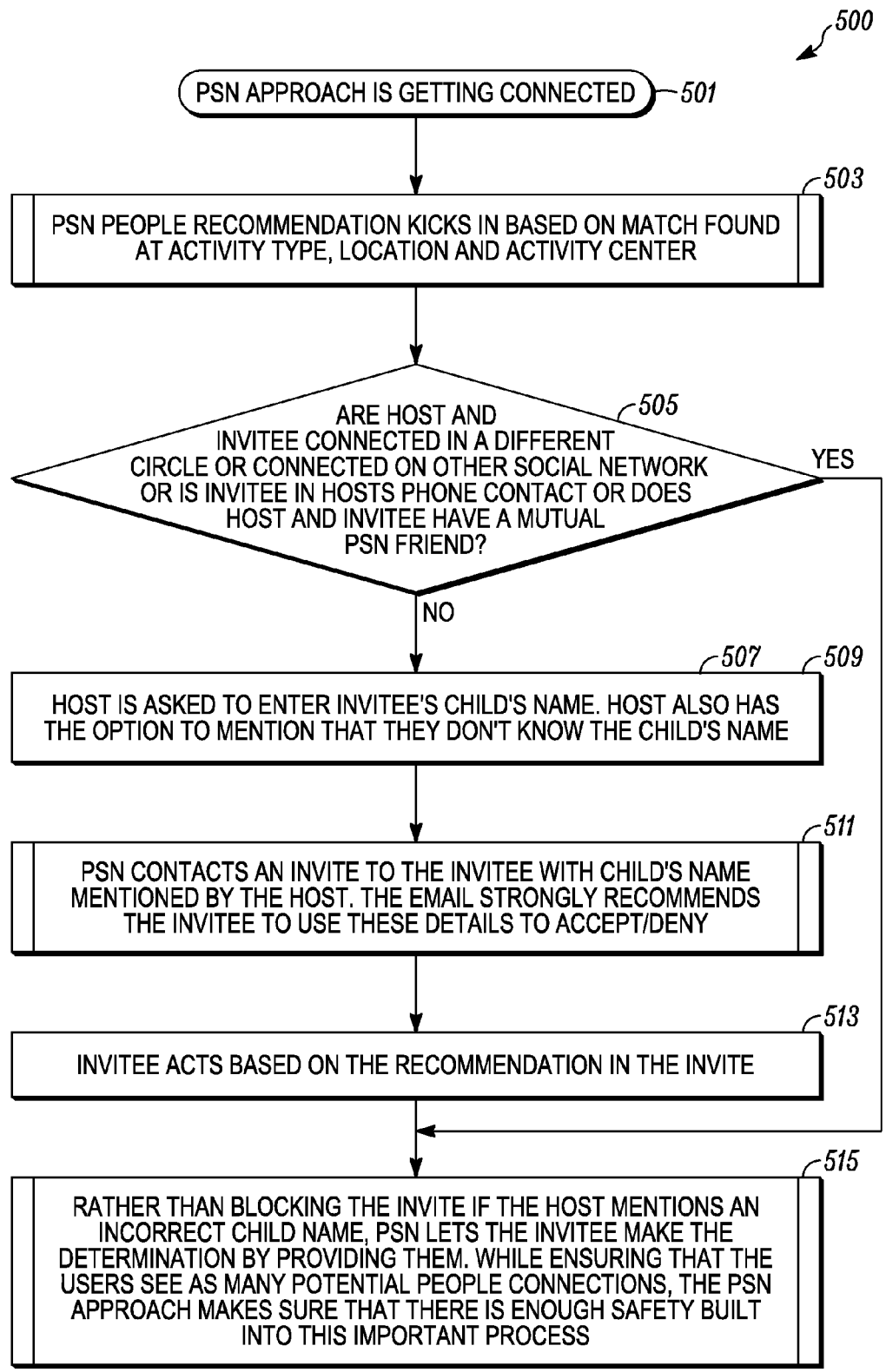
FIG. 5 shows a method flow for linking adults according to an embodiment.

FIG. 5 shows a method flow 500 for linking adults according to an embodiment. At 501, a safe connection method begins. Safe connection in this context includes providing a limited field of potential links that have children and may be verified by the PSN. At 503, the PSN recommendation engine searches the data in the network and determines matches for the parent. The matches can be based on activity type, location, activity center, school information or other data in the network. The matches are between adults, e.g., the user (host) and an invitee identified in by the recommendation engine. At 505, it is determined if the parent and an invitee are connected on another social network or if there is another connection between the parent and potential invitee. Other connections can include the invitee being in the contact list in computer, phone, personal data assistant or the like. Another connection can be the parent and the invitee having a mutual contact adult in the PSN. If step 505 determines a yes, then the method moves to step 515. If 505 determines no, then the method moves to step 507. At 507, the parent is asked to enter the invitee's child's name. The parent also has the option to indicate that he/she does not know the name of the invitee's child. At 511, the PSN contacts the invitee associated with the child's name mentioned by the host. The present method can also work with the parent providing their own child's name and other information associating the parent's child with the invitee's child. In operation, the communication from PSN to the invitee can be an email with enough identifying information so the invitee can confirm that their child has some association with the parent's child. The email strongly recommends that the invitee confirm the association using the details in the email or stored on the PSN. The invitee can also confirm with he/her own child that there is an association with the parent's child before accepting or denying the link request, e.g., to join a circle. At 513, the invitee acts on the invitation from the parent, either accept or deny. The acceptance can be through a user device to the PSN.

At 515, the PSN can decide to not block the invite if the parent mentions the incorrect child name. This can assist with spelling errors or nicknames. The PSN allows the invitee adult decide whether to accept, deny or block an invite. The PSN allows the adult users to see many potential connections but allows the invitees to control who they are connected to and whether the parent initiating the invite has the correct child. In an example, the parent initiating the invite may agree to allow the invitee to see more data about themselves, including data about their child, to allow the invitee to confirm the association between the children of the parent and the invitee.

The user devices 152 can receive data from the layers 108, 110 that was processed using instructions of methods described herein with reference to FIG. 5, e.g., for providing link and connection recommendations. The processing can be performed, at least in part, by layers 102, 104 and 106. The user devices 152 can also send input from parents to the layers 108, 110 for further processing in layers 102, 104 and 106. In some examples, some instructions are carried out on the user devices 152.

Figure 6:
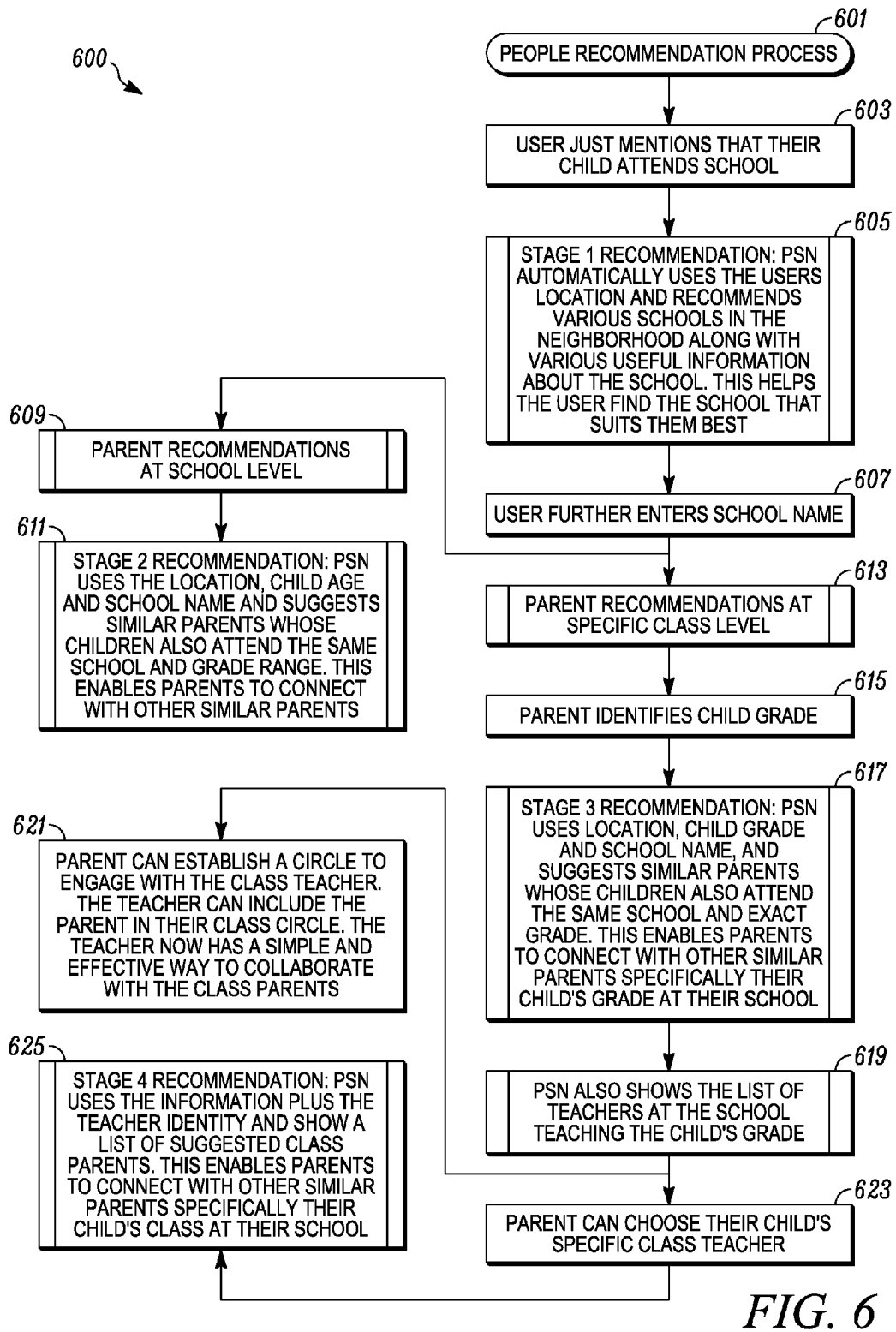
FIG. 6 shows a method flow for a recommendation in the system according to an embodiment.

FIG. 6 shows a method flow 600 for a recommendation in the system according to an embodiment. At 601, a people recommendation method begins. A user can trigger the people recommendation engine and method through a user device in communication with computing systems of the PSN. At 603, the user inputs the name of their child's school. This can be down by typing or a pull down selection menu. At 605, the PSN uses the user's location to select schools that are within a range of that location. The PSN can provide this selection of schools to the user. Other information about the school can also be provided. At 607, the user can further enter or select the school name. At 609, the parent can be provided with school district level recommendations. At 611, PSN uses the location, child age, school name, and finds adult matches to the parent. The adult matches are adults with children who also attend the same school and match additional criteria. The additional criteria can be age, grade or any other data known about the child. The matches between the parent and other adults can be provided to the parent, who can choose to join circles or groups with the matched adults or send invites to link with the matched adults.

At 613, the parent can search for adult matches at the specific class level of their child. At 615, the parent enters into the PSN the grade that their child attends. At 617, the PSN uses the location, child grade and school to determine matches to other adults. The adult matches are adults with children who also attend the same school and are in the same grade. The PSN can also use additional criteria when matching. The additional criteria can be age, grade or any other data known about the child. The matches between the parent and other adults can be provided to the parent, who can choose to join circles with the matched adults or send invites to link with the matched adults with children in the same grade at the same school as the parent's child. At 619, the PSN can provide a list of teachers that teach in grade and school that the parent's child attends. At 621, the parent can establish a class circle or join seek to join an existing one to engage or connect with the teacher. The teacher can be the adult who hosts the class circle. The teacher can verify the parent is the parent of a child in his/her class and allow the parent to join the circle. At 623, the parent can indicate their child's specific class teacher. At 625, the PSN can recommend adults to the parent based on the teacher identity. The PSN can provide a list of adults with children in that teacher's class. As a result, parents of children in a same class can connect together or join a class circle for that specific class. With the establishment of a circle for a class, the teacher can communicate with all the parents through the circle. The teacher can also link their class circle with the class circles of the other classes in the same grade to create a grade circle. The teacher can further link their grade class circle to a school circle so that school wide communication can be done through the PSN. The teacher can further link their grade class circle to a district circle so that district wide communication can be done through the PSN.

The user devices 152 can receive data from the layers 108, 110 that was processed using instructions of methods described herein with reference to FIG. 6, e.g., for providing recommendations to link parents together. The processing can be performed, at least in part, by layers 102, 104 and 106. The user devices 152 can also send input from parents to the layers 108, 110 for further processing in layers 102, 104 and 106. In some examples, some instructions are carried out on the user devices 152.

Figure 7:
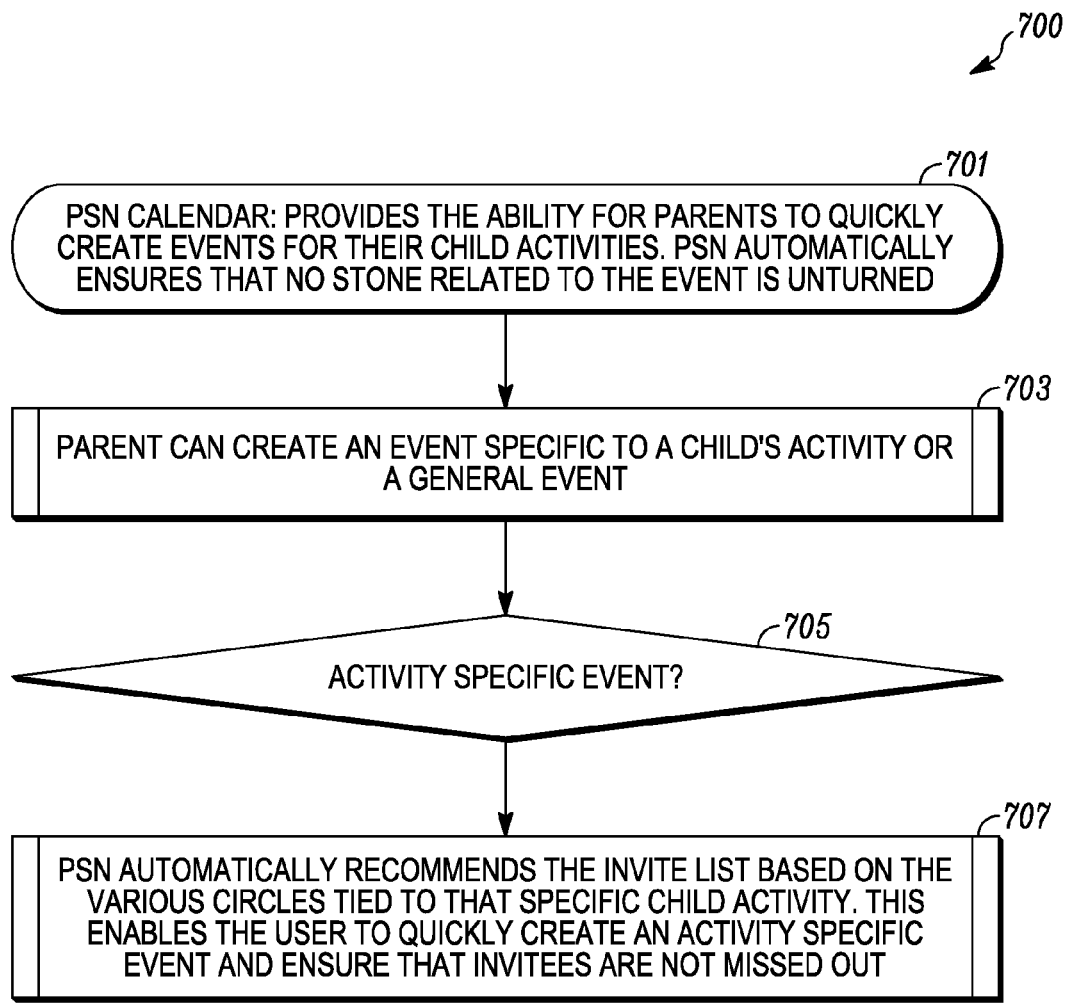
FIG. 7 shows a method flow for activity specific events according to an embodiment.

FIG. 7 shows a method flow 700 for activity specific events according to an embodiment. At 701, the PSN provides a calendar to the parents. The PSN can store a calendar and associated tasks with dates and times on the calendar. Calendars can be related to individual parents or circles. At 703, the parent can enter an event or task specific to their child's activity, class, or relationship to another child. At 705, it is determined if the event or task is activity specific. If yes, then at 707 the PSN automatically recommends that other adults in that activity be notified of the activity or task. In an example, parents of children in a dance group can be notified of a dance practice when the instructor or parent creates the event in the dance group calendar. The PSN can also notify adults with children in the dance group of any changes via electronic communication.

The user devices 152 can receive data from the layers 108, 110 that was processed using instructions of methods described herein with reference to FIG. 7, e.g., for specific events and calendar processes. The processing can be performed, at least in part, by layers 102, 104 and 106. The user devices 152 can also send input from parents to the layers 108, 110 for further processing in layers 102, 104 and 106. In some examples, some instructions are carried out on the user devices 152.

Figure 8:
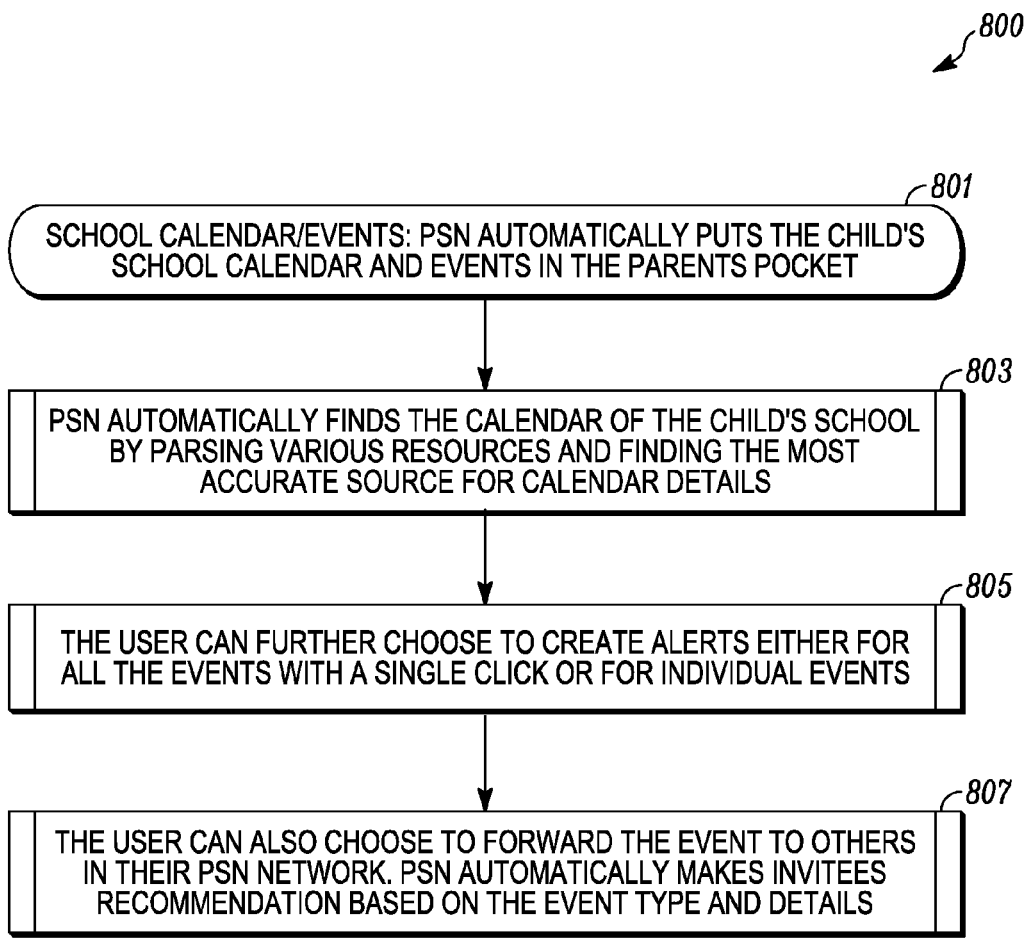
FIG. 8 shows a method flow for school calendar events according to an embodiment.

FIG. 8 shows a method flow 800 for school calendar events according to an embodiment. At 801, the PSN can automatically provide parents with access to the calendar associated with their child's school district, school, grade level, and class(es). At 803, the PSN generates a parent specific calendar by parsing the data for the school attended by the child. At 805, the parent can choose to enable certain alerts that can be generated by the PSN. The alerts can be emails, texts, tones or other notifications to the parent to remind and inform them of individual calendar events. At 807, the parent can also choose to forward the event to others in their PSN network. The PSN network can also use the event information, type, location, activity or other data to make invitee recommendations to the parent. For example, if two parents are attending the event, there may be a likelihood that that the parents should be connected on the PSN.

The user devices 152 can receive data from the layers 108, 110 that was processed using instructions of methods described herein with reference to FIG. 8, e.g., for school calendar processes. The processing can be performed, at least in part, by layers 102, 104 and 106. The user devices 152 can also send input from parents to the layers 108, 110 for further processing in layers 102, 104 and 106. In some examples, some instructions are carried out on the user devices 152.

Figure 9:
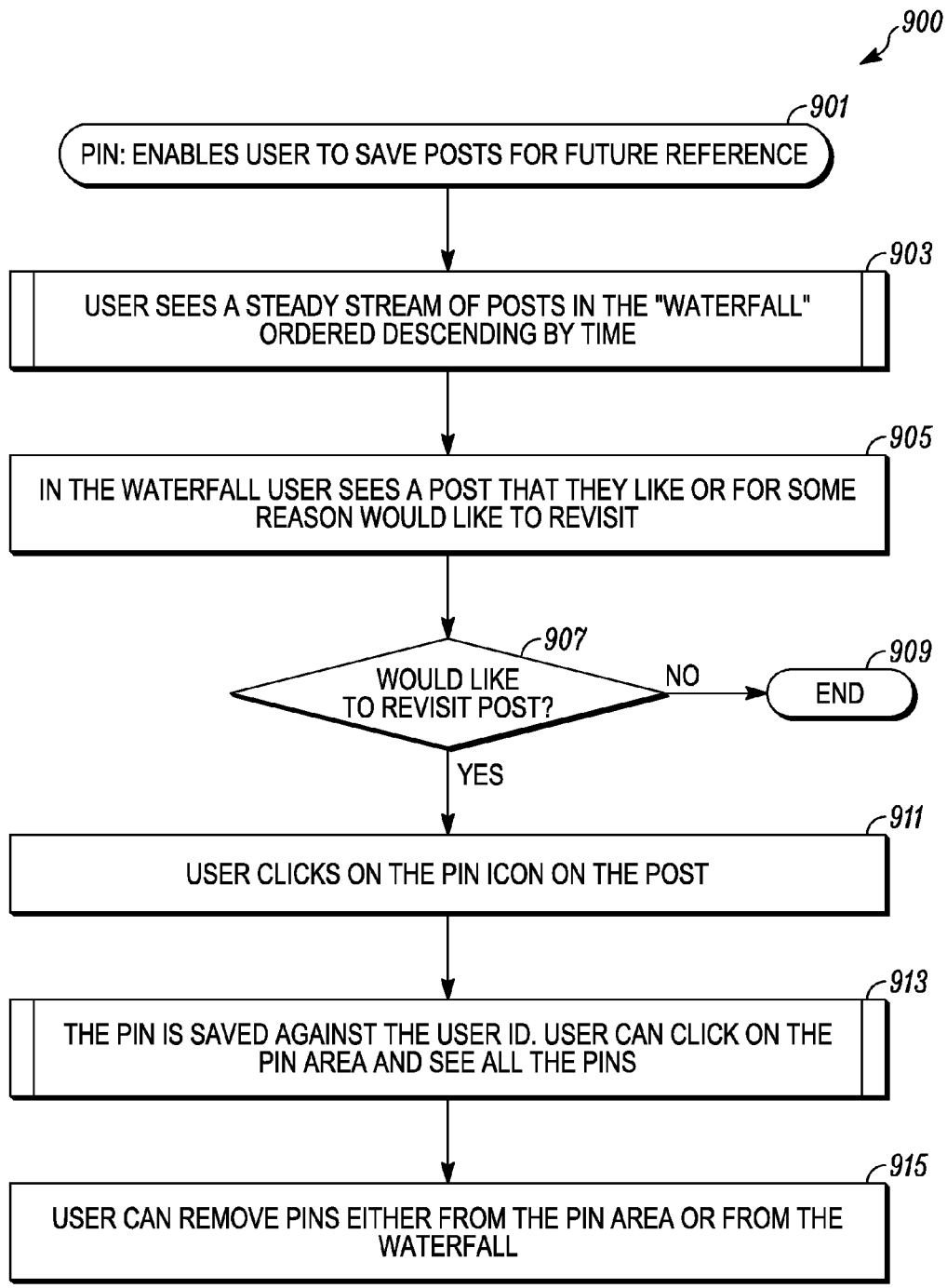
FIG. 9 shows a method flow for using pins in the system according to an embodiment.

FIG. 9 shows a method flow 900 for using pins in the system according to an embodiment. At 901, the PSN provides a pin that enable users to save posts for future reference. The saved posts are stored in the memory or databases of the PSN. At 903, the user can see a stream of posts in an ordered list, e.g., a waterfall type of display with the newest post on top or the oldest on top post. A post is information entered by a parent that is associated with the user. At 905 the user sees, e.g., on their user device from data provided by the servers of the PSN, the ordered list of posts. The user identifies a post that they wish to tag and save for later. At 907, the user decides whether to save the post. If no and at the end of the posts, the method can end at 907 or can return to review more of the posts. If yes at 907, then at 911 the user selects the post, e.g., by clicking on an active area (e.g., icon) on the post. At 913 the post 913 is saved and associated with the user. When the user wishes to review the saved posts, the user can select the pinned folder or icon to display their saved posts. At 915, the user can remove individual pins from individual posts or remove all pins resulting in no saved posts. This can be done by the user selecting the function that they wish.

PSN can provide the ability for parents and other types of users to make instantaneous posts on their wall. These posts will be available to the subset of friends the parent chooses to post to. Likewise the parent receives a constant flow of posts from his/her friends. There will be several of these posts that are relevant to the parent; however there will be a few of these that parent would like to revisit or read again. There are a few reasons the parent will need to do so such as: the post being very important, the post being actionable and the user wanting to act on it later, or the post being highly informative and the user wants to read it from time to time. PSN provided a platform by allowing the user to "pin" or save the posts. They can then re-read the posts that they pinned. They can also "un-pin" to remove the posts from the pinned set.

The user devices 152 can receive data from the layers 108, 110 that was processed using instructions of methods described herein with reference to FIG. 9, e.g., for pin processes and post processes. The processing can be performed, at least in part, by layers 102, 104 and 106. The user devices 152 can also send input from parents to the layers 108, 110 for further processing in layers 102, 104 and 106. In some examples, some instructions are carried out on the user devices 152.

Figure 10:
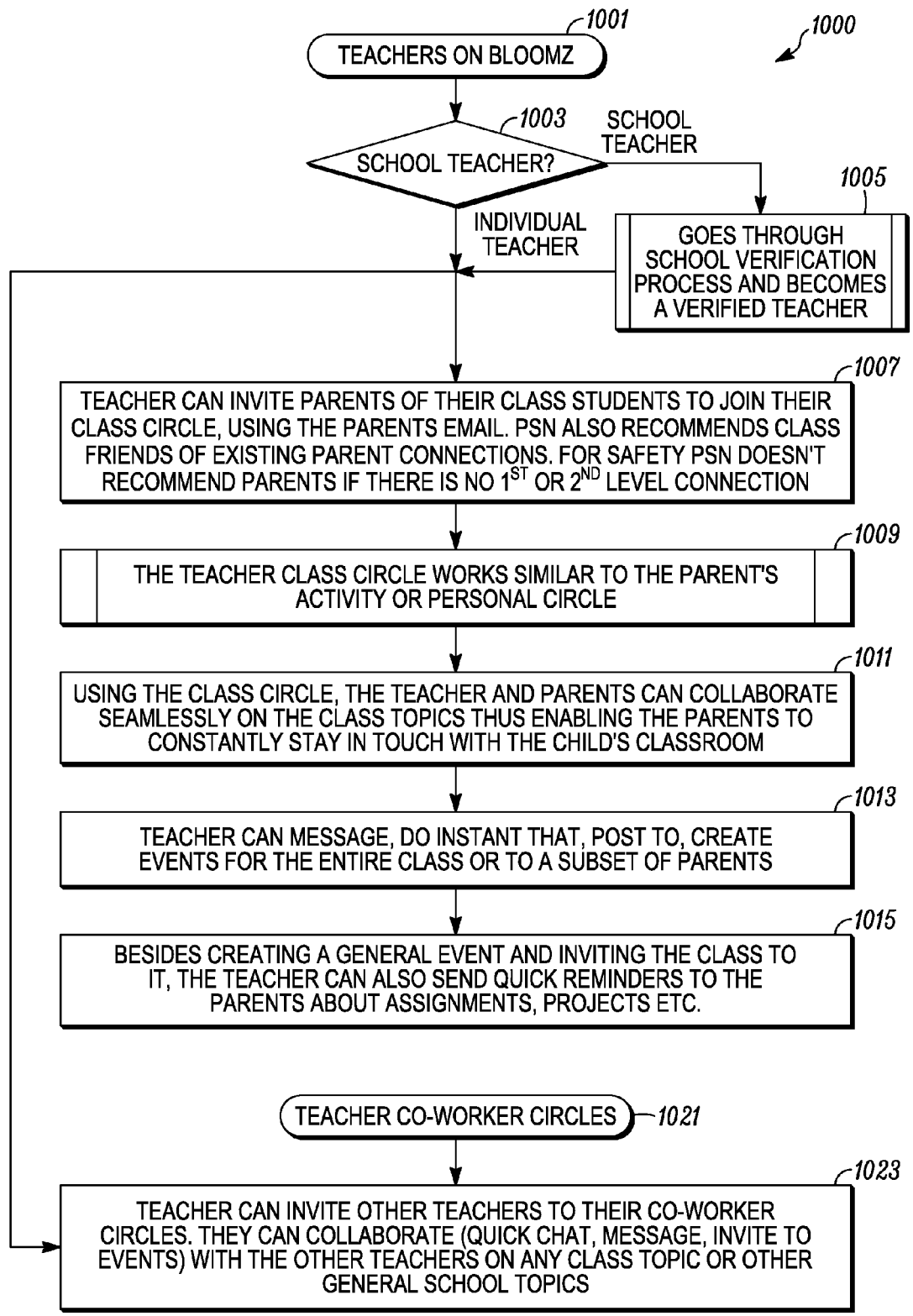
FIG. 10 shows a method flow for creating school based circles according to an embodiment.

FIG. 10 shows a method flow 1000 for creating school based circles according to an embodiment. At 1001, the PSN can store and identify individuals as teachers. At 1003, a teacher is identified as a school teacher or a teacher who is not associated with a school. If the teacher is a school teacher, then at 1005, the PSN verifies the teacher as part of the school. In an example, the administration of the school can control which teachers are associated with their school. The school administration can establish a super user who can associate and disassociate teachers with regard to their school. At 1007, a teacher can invite the parents of children in their class to join a class circle, e.g., using a parent's email address or mobile telephone number. The PSN can then run the recommendation engine on the parents in the PSN to recommend other possible links their children in the class and the children's activities. In an example, the PSN does not recommend parents link or connect if there is not a first or second level connection. At 1009, the class circle can be used for communication to all of the parents with children in the class. The class circle can be used like any other circle as described herein but the communications are limited to those in the circle, which can be controlled by the teacher. At 1011, the teacher and the parents can collaborate on class topics. This can keep the parents better informed on classroom activities and scholarship. At 1013, the teacher can communicate with the circle members via email, posts, messaging, and calendar to the entire circle. The teacher can also create sub-circles of the parents for specific topics. At 1015, the teacher can send quick reminders to the circle members regarding assignments, projects, upcoming events etc. This reduces the risk of children not delivering papers or informing parents.

At 1021, the teacher can create teacher based, co-worker circles. These can be stored in the PSN. At 1023, the teacher can invite other teachers to the co-worker circles. In an example, the co-worker circles are identified as work circles and parents can be blocked from joining these circles. This can provide closed communication for the teachers and not send internal work communications to parents. Such teacher circles can allow teachers to collaborate on any class topic and other general school topics.

The user devices 152 can receive data from the layers 108, 110 that was processed using instructions of methods described herein with reference to FIG. 10, e.g., for school community, circle, and/or school verification processes. The processing can be performed, at least in part, by layers 102, 104 and 106. The user devices 152 can also send input from parents to the layers 108, 110 for further processing in layers 102, 104 and 106. In some examples, some instructions are carried out on the user devices 152.

Verification can be done at the school level. As part of building secure school communities in the PSN, every member needs to be verified. This ensures that right from the early times of PSN, parents (or other members) get a sense of secure feeling in PSN. This verification process described herein may not be used to limit PSN membership but can be used for that particular community membership. The present verification can be used to differentiate between Unverified member vs Verified member vs PTA member.

An unverified member can be limited in their ability to access information on the PSN. Until a member is verified (using the verification process in the PSN), he is unverified or unapproved in the group and can't do anything in it—posts, events, messages etc. Their access inside the community is very similar to a "guest" accessing the community. So their privilege is limited to functions associated with a View Info tab, a View Members tab, a view calendar tab or message administrators. The classes tab and its associated functions in the PSN are hidden from unverified members The unverified members of the PSN can view the community calendar. The PSN does not allow the unverified members cannot be auto-subscribed or be invited to an event when an invite is sent to the community members as they are not an approved member yet.

Unverified members in the PSN can message the administrators just like they can message anyone on the PSN. Unverified members can view who the administrators are in the Members tab and function in the PSN. This allows administrators to communicate with the administrators if unverified members want to discuss for example about getting verified.

The PSN can also have verified members that have different status in the PSN relative to the unverified members. Once a user (parent or other responsible adult) is verified (approved) in the PSN for a community, they become verified members. They enjoy the standard member privileges such as being able to post and receive posts from the group (circle, community, etc.), view group calendar and auto-subscribed to it, message members, invite members, verify members. In an example, a verified member of a school community does not automatically make the user a PTA member. Each group can require that members be verified on its own terms.

The PSN can also have a PTA member status or verification process. PTA administrators are the ones that typically invite or approve a member to be a PTA member. Note that in the user interface provided by the PSN when a member is made either a PTA administrators or PTA board member or PTA staff they are automatically made a PTA member. All PTA members are verified members. The reverse is not necessarily true.

The PSN can also have PSN verified members. Verification to a particular school community is nothing but getting approved to become a member of a school community. This is separate from getting a PTA member status. The PSN can use the individual school community membership to derive the PSN level verified member status as follows. Any user in the PSN system becomes a "PSN Verified Member" if they are member of at least one "official" school community. Official school communities are ones that are either have the official school or official PTA onboard. Such users get the verified member badge (e.g., a green tick mark at the top right corner) which needs to be displayed in three places—contacts listing, member search listing, and in the member profile. The PSN can show the badge in Contacts and Member profile, for example, on the user interfaces set to user devices. Selecting, e.g., clicking, on the badge should navigate to the Verified Member detail page which explains the safety approach of the PSN. This page can show the list of communities (school and class) of which the user is a member.

The PSN can provide a verification process. Early adopters of the PSN can be verified differently than later adopters. The first members (e.g, 10 or less, number should be configurable so PSN can change the number of members), irrespective of the role, will be verified as follows. If a member is a verified member of another school community then they are auto-verified in the PSN. The PSN can use phone verification. The PSN can request the parent to enter a number. The PSN can call the parent and ask them to enter the number, e.g., a 4 digit code.

In another example, the PSN sets a first member privilege. The PSN can make the first member the School Admin of the community.

The PSN also verify members who have been invited by other verified members. In an "unofficial" school (either school becoming official or PTA becoming official), regular verified members should be able to invite any role. Once a community becomes "official" in the PSN regular members can only invite regular members. When any verified member of a community invites users to that community, the invited users should automatically be considered verified for the role to which they were invited.

The PSN continues accepting members after the early adopters. For teachers on the PSN, there can be two options to get verified, phone verification or community sourced verification. In some processes, parents adding an child as part of PSN can also be subject to the same approval process as the people joining the PSN.

The PSN process for community sourced verification can include the following. When a parent seeks joins a community, the parent's membership in that community is put on-hold in the PSN. The already existing verified members (parents) of the community are requested to verify the new member. This verification can include sending general notifications are sent to all verified members of the community requesting them to verify the applicant user. In an example, the PSN can designate a community leader or leaders. The approval request can then be sent to the community leader(s) to verify the applicant user approval request. In an example, the verification requests are only sent to the community leader(s). Examples of approval requests can include electronic notifications can include a selectable icon that indicates "Approve (or Verify) member(s)" and can include the member name. The PSN can compile and send a digest email that can be an in-app personal feed aggregation post. In another example, there can be a notification center in the PSN that provides an aggregation post similar to a calendar invite/event notification in a parent's personal feed or the joined group notification post. In an example, the PSN can provide an in-app group member tab that can be selected to verify applicant parents from a member parent's page, in-app login page or other parent tab. In another example, the PSN can provide direct notifications (electronic communications) to specific members of the applicant group. Direct notifications will be generated by the PSN and sent to the discrete verified members are identified by either the PSN or the applicant parent as those who can verify the applicant member as eligible for the circle or the community. Some such users for whom discrete verified members can be identified can include an identified user identified, class parents, personally connected parents in the PSN, frequently contacted PSN parents, or a phone contact. In operation, the parent user who is requesting to join is shown the list of existing verified members (who have the privilege to verify others) and asked to identify a limited number of members who can verify the parent user. Class parents can also be used to verify the parent user. In an example, if the parent user is part of another class, e.g., at a different school or grade in the same school then all the existing class parents who are also a part of the requested community are automatically added to the direct notification list too. The personal connections of the parent user, who are also verified members of this community, are automatically added to the direct notification list or otherwise used to verify the parent user. The frequent communicator with the parent user can be automatically added to the direct notification list by the PSN. Frequent communications can be defined as a combination of (x number of posts and y number of event invites and z number of messages) between the parent user and the verified member. The phone contact of the parent user, who are verified members and in the parent user's contact list of the parent user, can be automatically added to the direct notification list or verify the parent user. Examples of communications for verifying users can be as flows. A call to action will be to "Approve (or Verify) member(s)", this can be an electronic communication using any of the communication abilities of the PSN. When email is used, the email can state "Hi User1, User2 is requesting to join the GR community. He has identified you as someone he knows. Being a responsible verified member of the GR community, please verify user1 if you can recognize (or vouch for) him." The verification can be as simple as a selectable link in the email or request that the addressee login to the PSN to verify. An in-app personal feed scan be used to verify the parent user and can be a post similar to similar to a calendar invite/event notification in their personal feed. An in-app group member tab icon can also be used to verify the parent user and can be electronically positioned on pages sent to a user device.

Once an existing PSN parent user is verified (approved) to a community, they need to be notified of their approval into the circle or community. When the parent user if approved the PSN can generate the notifications will be as follows. The PSN can generate and send a call to action notification that request the parent user to "invite more members to community". The PSN can also send an email to the parent user. The PSN can also generate and communicate an in-app personal feed post, which can be a post similar to a individual connection notification post in their personal feed.

If a parent user is not accepted into a community or circle, then a rejection email can be send after a period of application pendency or the parent user's request to join the group.

When a new user makes a "GetInvited" request, their request should be captured appropriately in the PSN and will be assigned a "Pending Approval" (or "On Hold") status. The PSN can have communities that are either "official" or "unofficial" in the PSN. Official communities are the ones that have a verified PTA or School leaders adopting them. Unofficial communities are simply started by existing users. They shall be encouraged in the app to make them "official" community by reaching out to PSN for community verification. An example of a verification is as follows for a teacher or school administrator. If school admin(s) exist then request is sent only to them and they can approve a group or parent user. Else if parent teacher (e.g., PTA, PTO or other) administrator(s) exist, then the request is sent to all of them. If the school administrator and the parent-teacher administrator(s) does not exist, then a request for approval sent to a PSN administrator. Optionally, the PSN can send a parent request, a parent can pick a school and input whether they are a parent-teacher association member or not. In some applications this can be required. The parent teacher member then picks a school, which is then approved by a school administrator. When a non-parent teacher association parent selects a school, the parent goes through a community sourced verification process. Note that even if this user falls into an early adopters group, which may not have full verification due to low participant numbers, they still have to be verified by a community member or be invited by some PSN member in some context. For example, when non-parent teacher association parent who didn't pick a school is added then a PSN administrator approves thru an administrator tool in the PSN. New parent user can be limited to one request per new user, i.e., they cannot request to be a teacher of one school and a parent teacher association leader of another school. Once their request is approved, an approval communication or notification, e.g., an email, which has their invite code is sent to the user. This communication can be similar to the when they are invited to join PSN or a particular school/group. The user can then use the code to join, the PSN process flow can be similar to if they were invited (as a particular role to a community or a connection request).

The PSN can also provide methods to approve multiple requests at once. When multiple roles are selected, a method for this can include using a role precedence (high to low): 1) Teacher, 2) PTA Admin, 3) Parent. The target approver(s) need to be selected as though it is submitted as a single role request for the highest role, i.e., if they choose admin and parent, request needs to be handled as though it was submitted for admin only. The request to the appropriate approvers should show all the roles requested. So in this example the request should be submitted to the folks who can approve an admin role—it shouldn't be submitted for parent request. The approvers approve all or none. There other possible scenarios after the user has gone thru the GetInvited process and before they get approved for that request:

They get invited by another PSN user—personal invite or to join a group (same or different).

If he is invited by a user in the same original getInvited context (community and specific role), his request is approved.

If the GetInvited context (community and role) is not in the list of his invites.

If his GetInvited request is for a regular parent (not pta parent) role then his request is approved.

Else he goes the GetInvited approval process described above.

The user joins PSN and goes thru the PSN interface for all the invitations he was "Invited" to by others & any approved requests. Note that any requests that are still pending approval should not be included in the interface at this time.

If a user didn't get invited by anyone, then the user can't join PSN at all until he either gets invited by an existing member or his own request gets approved.

Figure 11:
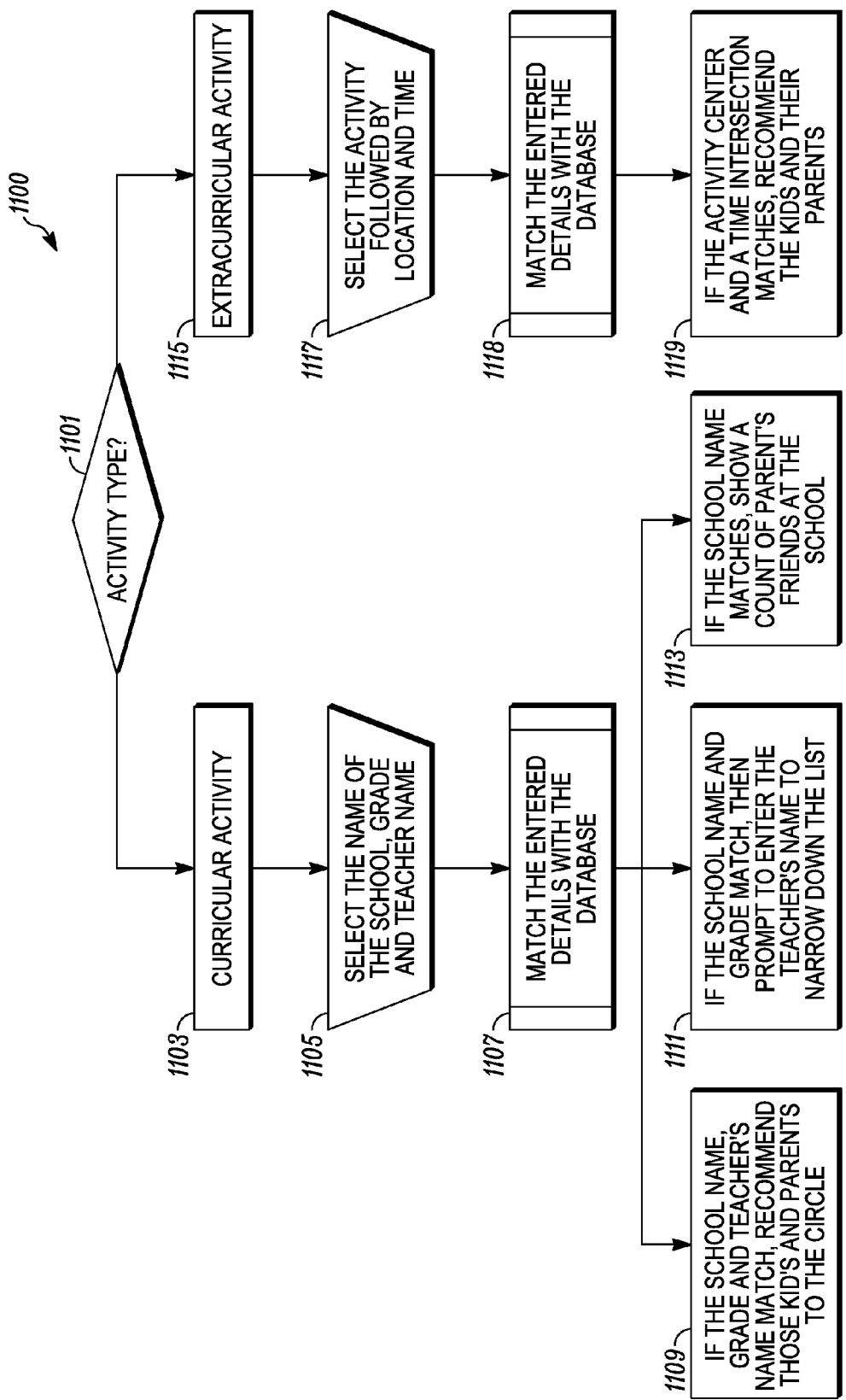
FIG. 11 shows a method flow for creating activity based links for adults according to an embodiment.

FIG. 11 shows a method flow 1100 for creating activity based links for adults according to an embodiment. At 1101, the PSN identifies an activity type. This can be designated by the user creating the activity or determined by the PSN based on the circle in which the activity is created. If the activity is a curricular activity, then the method moves to 1103. If the activity is an extracurricular activity, then the method moves to 1115. At 1105, the curricular activity requests the name of the school, grade and teacher name. In an example, these are entered by the user. In another example, the name of the school, grade and teacher name is determined from the circle in which the activity is created. At 1107, the PSN confirms the activity data with data already stored in the PSN database(s). At 1109, if the school name, grade and teacher match, then the PSN recommends the adults associated with the activity to join the circle, if one does not exist. The association can be through the children participating in the activity. At 1111, if the school name and teacher match, then prompt the user with a list of teacher names to ensure proper entry of the name. At 1113, if the school name matches, shown a count of parent's linked adults at the school.

At 1115, the extracurricular activities are processed in the PSN. At 117, the activity is selected or entered by a user. The location and time are also selected or entered. At 1118, the PSN matches the activity with data in the PSN database. At 1119, if the activity center and time match to other activities, then recommend that adults connect or join a circle based on the common child activity entered.

Accordingly, the PSN can link or join adults with children having the same curricular and extracurricular activities.

Figure 12:
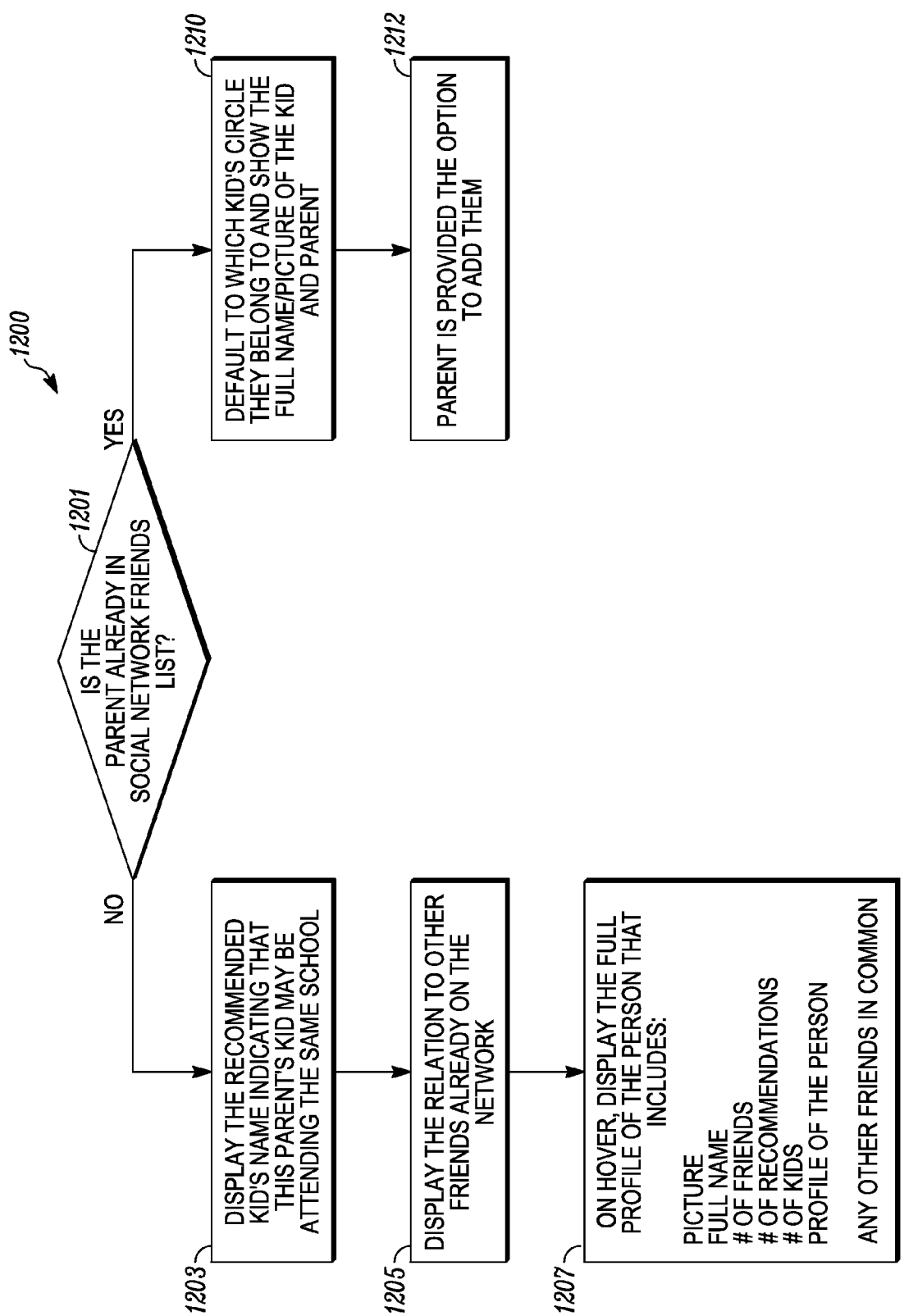
FIG. 12 shows a method flow for using current social networks to link adults in the system according to an embodiment.

FIG. 12 shows a method flow 1200 for using current social networks to link adults in the system according to an embodiment. At 1201, it is determined if the parent is already a member of a social network. Examples of a social network include Facebook, LinkedIn, Café Mom, Classmates.com, Google+, Foursquare, Instagram, Pinterest, Tumblr, Twitter, etc. If the parent is not in another social network, then at 1203, the network sends to the user's device or to a display the recommended child's name to the parent or another child attending the same school. This step can be limited to recommending parents of children who attend the same class in the school or are in the same grade in the school. The recommendation is between the parents and can be based on the relationship of the children. The system does not recommend the children connect. At 1205, the system determines and displays relationships to other linked people who are in the parent social network. Displaying can include sending the data to a user's device. At 1207, when the user moves a pointer, cursor or finger, in the case of touch screens, over the name of a person being displayed by the system, more information about that selected person can be displayed. The person's information can include a picture, full name, nickname, number of friends, number of recommendations, number of children and friends in common. The user can use this information to expand their social network and verify the identity of the other parent to whom they are linking. If step 1201 results in a yes and the parent is in a social network, then the present system can use that social network data to select a children's circle. When verified in using the other social network data, the user can be shown information relating to the parent and child to whom they should link and be part of a circle. At 1212, the user is given the option to add the parent and other parents in associated circles as contacts or links in the parent social network.

The user devices 152 can receive data from the layers 108, 110 that was processed using instructions of methods described herein with reference to FIG. 12, e.g., for processes that use other social networks to join or update parent/user information in the PSN. The processing can be performed, at least in part, by layers 102, 104 and 106. The user devices 152 can also send input from parents to the layers 108, 110 for further processing in layers 102, 104 and 106. In some examples, some instructions are carried out on the user devices 152.

Figures 13A, 13B, 13C:
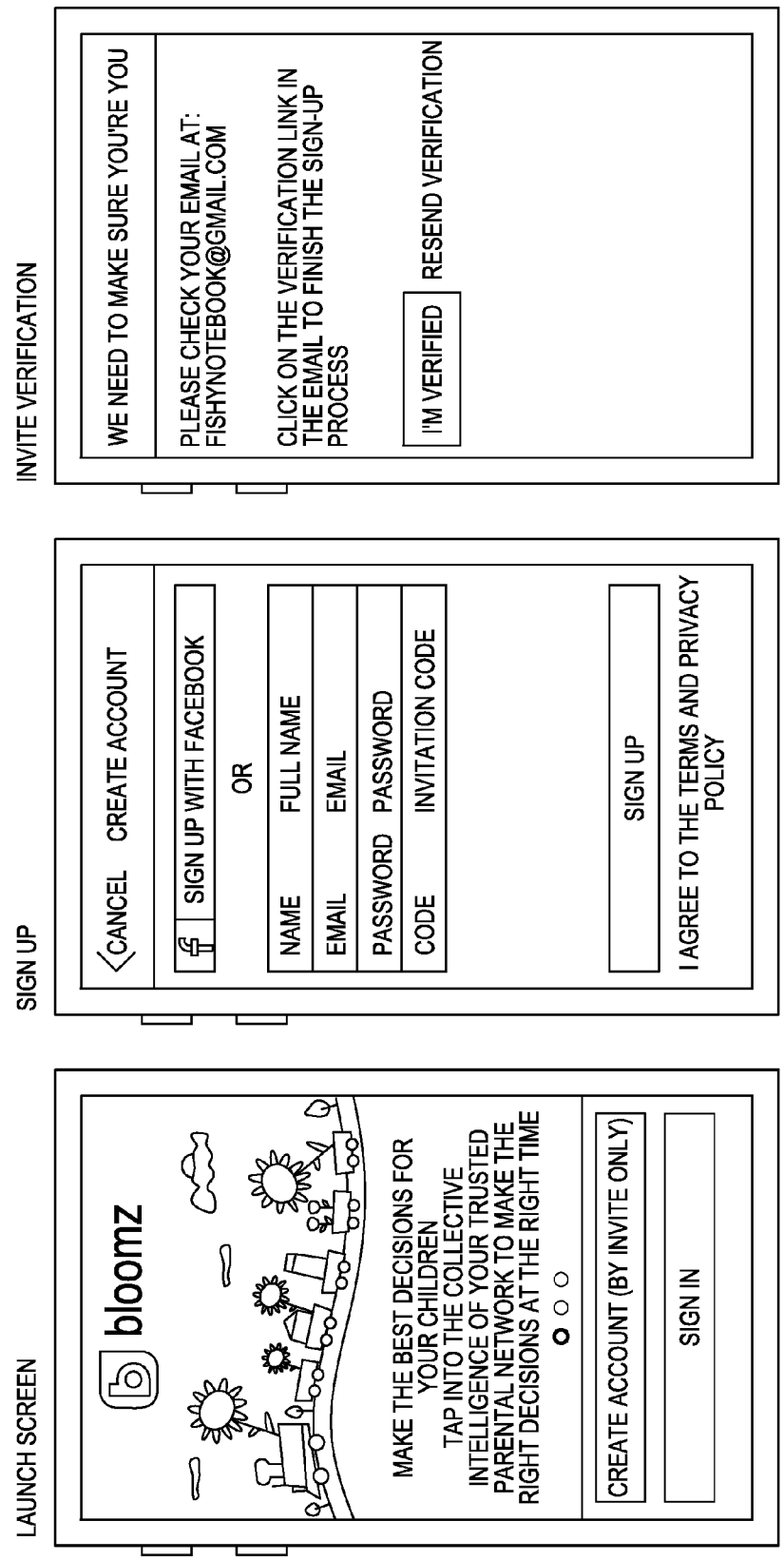
Figures 13D, 13E, 13F:
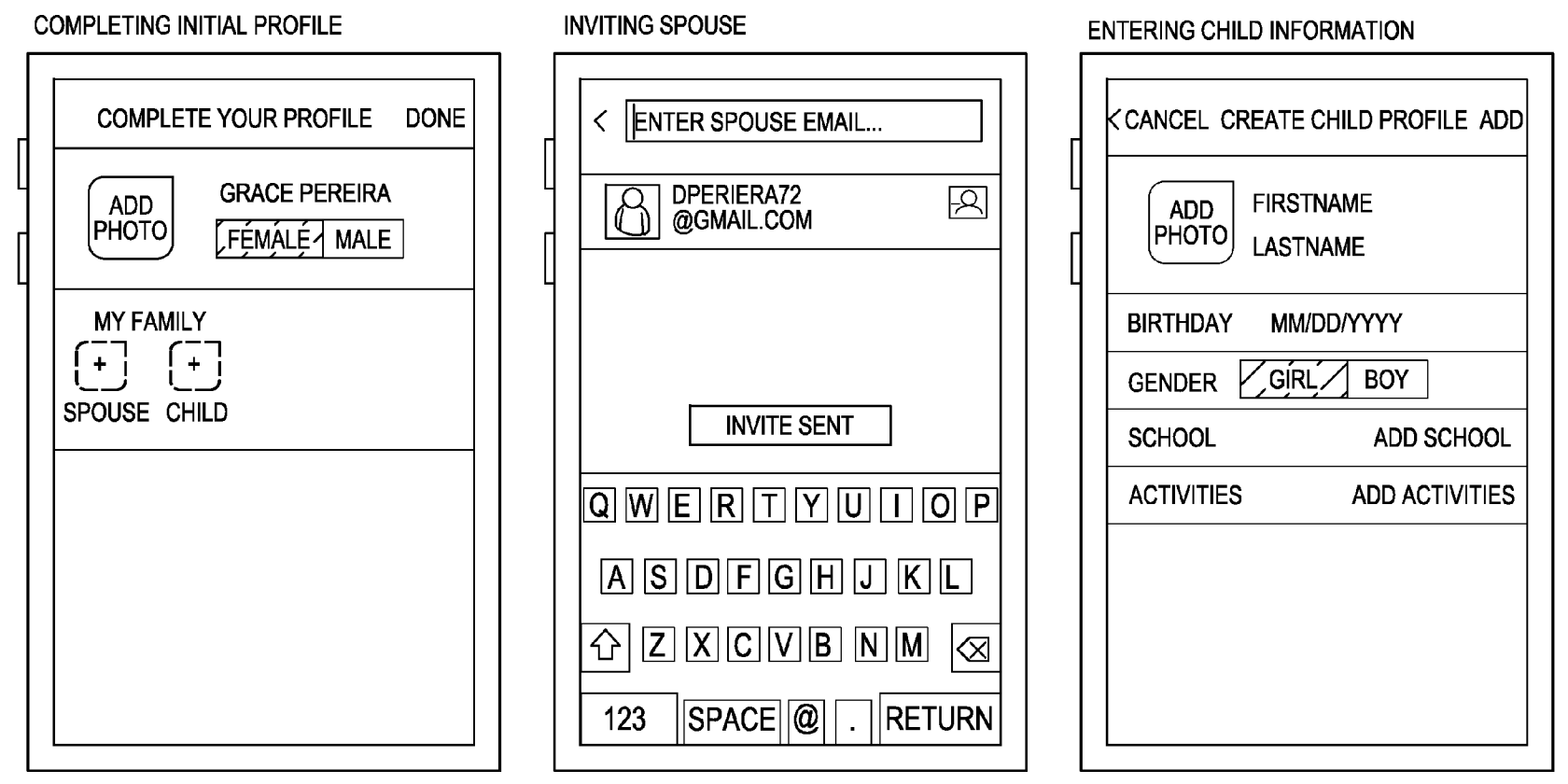
Figures 13G, 13H, 13I:
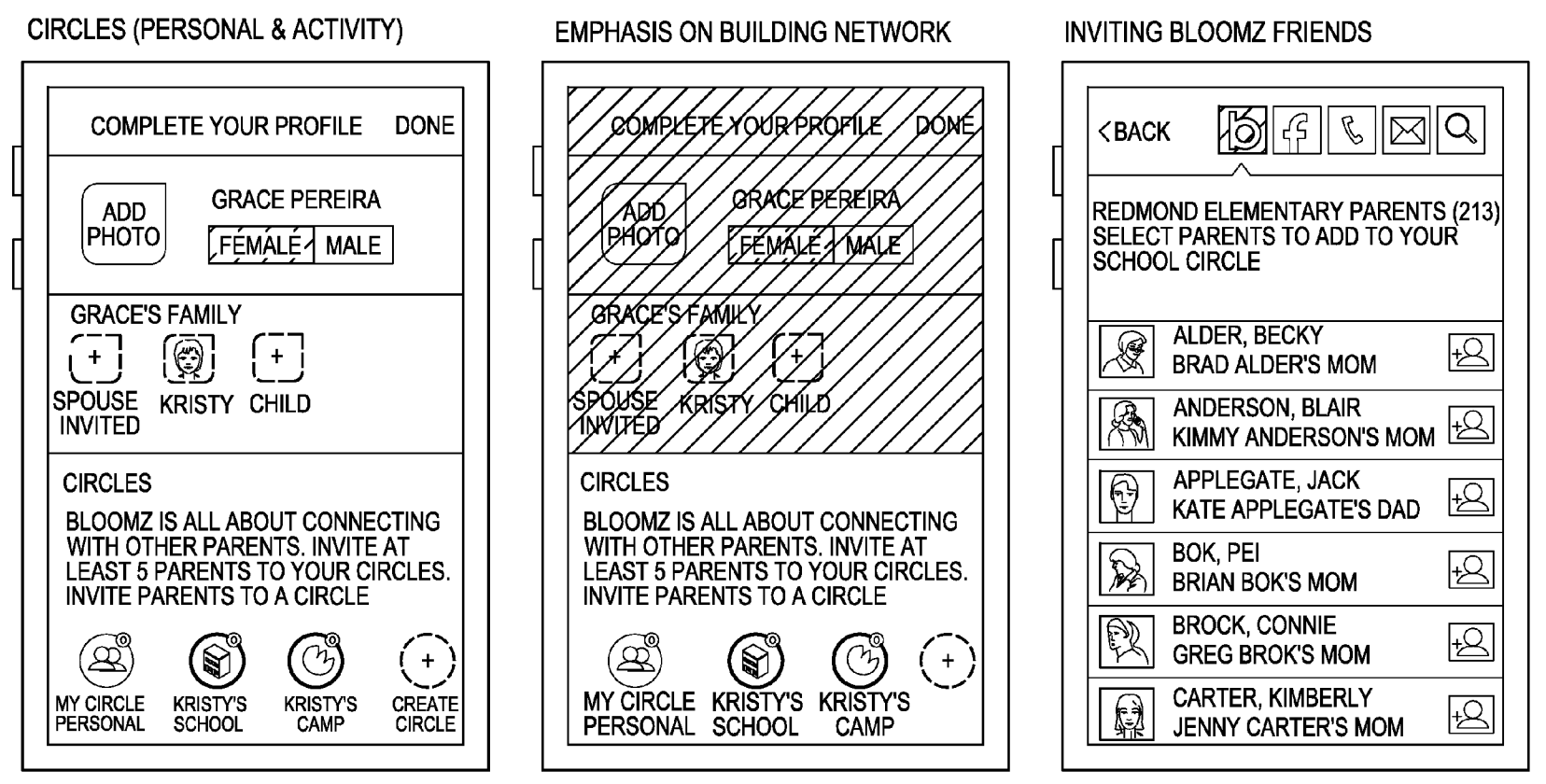
Figures 13J, 13K, 13L:
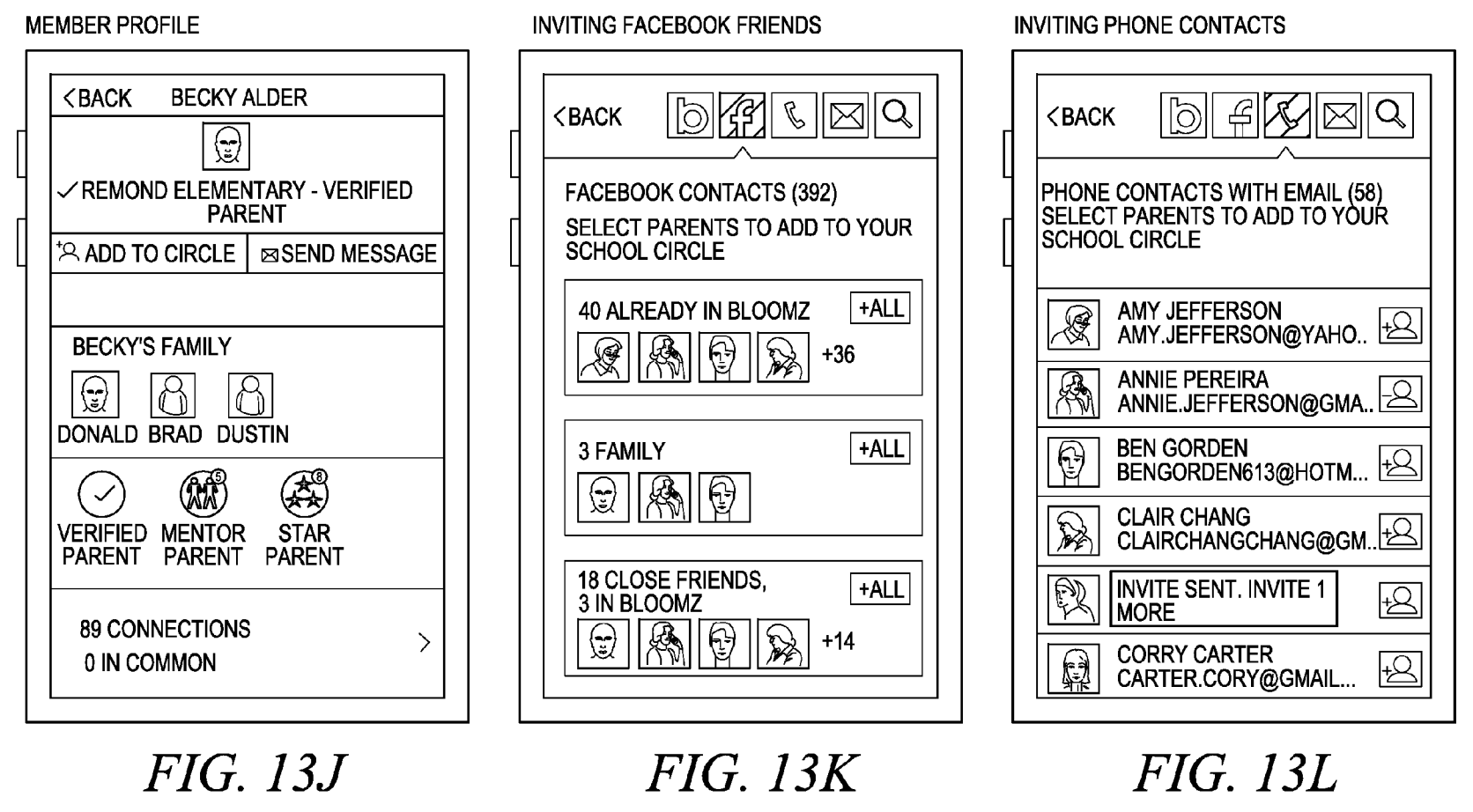
Figures 13M, 13N, 13O:
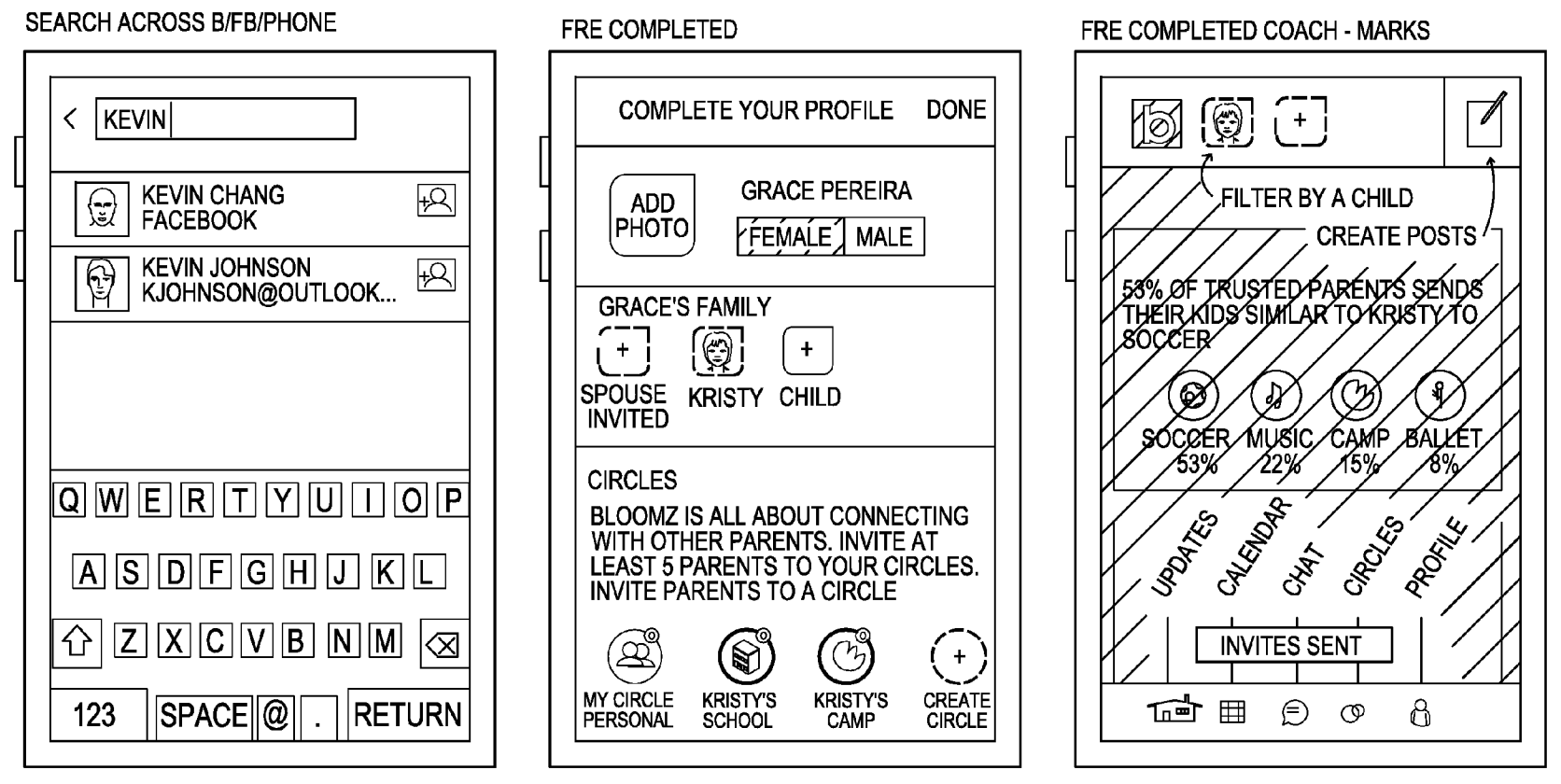

FIGS. 13A-13O show screen shots of an example application flow generated by the system for a parent initial experience. The screen shots can be produced from data generated by the circuitry and processors of the parent social network ("PSN") system. The displays can be shown on various displays, e.g., on user devices, computers, terminals, mobile handsets tablets, etc. FIG. 13A shows a login display for the PSN. The user can select to login if they have an account or establish an account if accessing the PSN for the first time.

FIG. 13B shows a parent data entry display that allows a parent to enter identifying information to sign into the PSN or use another social network to login. In the illustrated example, the other social network is Facebook but the present disclosure is not so limited. The identifying information can include name, email address, a password and a code. The code can be a code provided to the user from other parents or a school to identify the user as a parent. This can assist is limiting access to the PSN by non-parents or those without a connection through their children to other children, activities or schools on the PSN.

FIG. 13C shows a confirmation display that informs the user setting up an account on the PSN to check their electronic communication, e.g., email, messaging, etc., for a confirmation message to verify the user and their account.

FIG. 13D shows a parent profile display that allows a confirmed user to identify themselves as a mother or father, add a photo, add family information. Other parent data can also be entered such as home address, work address, phone numbers, etc.

FIG. 13E shows an inviting spouse display that allows the user to enter spouse information to invite the spouse to join the PSN. The PSN will then know the relationship between these two adults and can share circles or information and links if they are indicated as married or divorced but have an amiable relationship when it comes to their joint children.

FIG. 13F shows a child data entry display that allows the parent to enter child identifying information. This data is can be used to recommend connections to other parents as such recommendations are made through child activities, school, and relationships. The child information can include name, school grade, class teacher, activities, siblings, etc.

FIG. 13G shows a parent data entry display that allows a parent to confirm their family members and circles recommended by the PSN. The PSN uses the data entered by the parent and based on child information recommends circles for the parent to join.

FIG. 13H shows a network building display that emphasizes that the parent should build a network of parents that have some connection at the child level with the parent. The circles being suggested by the PSN can be circles that have parents already in those circles. The PSN can also allow the parent to suggest parents that should be part of those circles.

FIG. 13I shows a listing of parent's display that the PSN predicts have some relationship at the child level to the parent. The parent can select the predicted parents that the current parent knows that they have an activity, school, or other link between the children of both parents.

FIG. 13J shows a display of a selected parent that may be a connection to the parent. The display shows the name, picture, family, circles and connections of the selected parent. The parent can select the selected parent's family member(s), circles or connections to establish further connections. As stated herein, the PSN can limit the ability of the parent to follow other people's connections to a first level connection or a second level connection.

FIG. 13K shows a display using contacts at another social network. In the illustrated example, the parent's Facebook connections are loaded into the PSN. The PSN then identifies the contacts from the other social network already in PSN. The PSN can further filter the contacts from the other social network into other categories, e.g., family, and close friends.

FIG. 13L shows a display of contacts from the phone contact list. The phone contact list can be filtered by the PSN. The filter can be those contacts with an email address. The PSN can also filter based on mobile phone numbers or those with who the parent has tested in the past. These contacts along with other social network contacts can be loaded into the PSN.

FIG. 13M shows a search display that can be used by the parent to search across the contacts loaded into the PSN from outside sources, e.g., other social networks, phone, email contact list(s), etc. The parent can then select the contacts with whom they should load into PSN or link in the PSN.

FIG. 13N shows a display that allows the parent to complete and confirm their profile.

FIG. 13O shows a display that allows a parent to filter contacts or circles by child or create a post in the PSN.

PSN can provide many benefits and functions for parents. PSN is the only social network application which helps parents make the best decisions for their kids based on their kids. Other social networks are not directed to children activities but be directed to parents. PSN provides parents the power of an extensive parent network, not merely a social network. PSN provides the power of "Smart discovery" of the environment around the parent's children. PSN provides parents with data driven recommendations on activities and advices that help their kids reach their full potential. The PSN saves time by connecting parents instantly with other parents and educators that matter most to the parents. The PSN assists parents get the little things in life done quickly so they can focus on the big ones, e.g., by consolidating parent's communications around children in one place, enables collaboration with family and social members around children activities, enables one to stay on top of one's parental tasks, unlocks the potential opportunities for one's child with collective parent intelligence of one's trusted personal parent network, provides intelligent recommendations based on the child's interests/needs/environment, helps find the right activity center/school/daycare, and helps plan parents' activities around their children.

Figure 14:
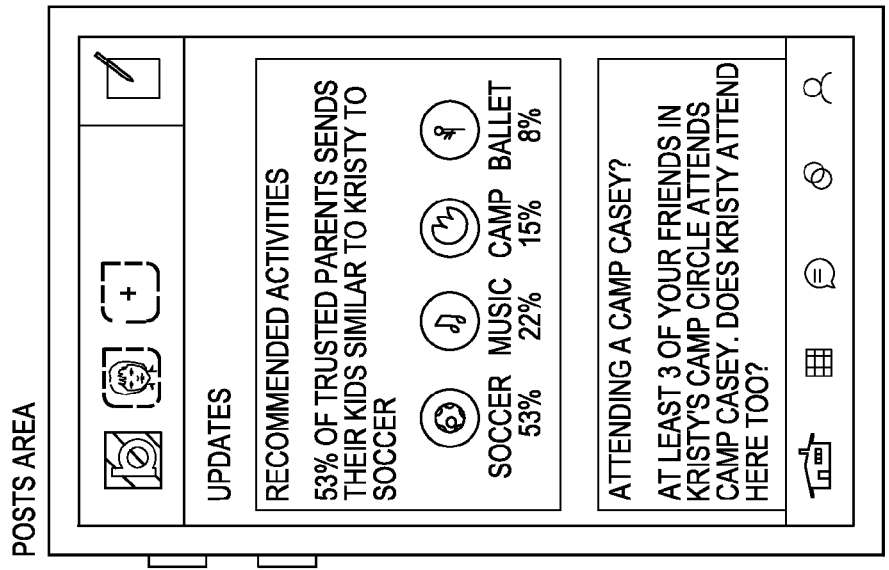
FIG. 14 shows a posts area in the social network.

FIG. 14 shows a screen shot (on a display) of a posting application for the social network described herein. The posts display shows various updates since last checked by the parent. Here, the updates are recommended activities. The parent can post to a circle or another user that relates to their child selected. In the illustrated example, the PSN shows recommended activity of soccer and with the percentage of parents with children similar to the user's child that are sending children to a specific soccer activity. The user can also see a post from another user asking if your child is attending a camp that is being attending by other children in your circles or in the parent's network.

FIGS. 15A-15I show screen shots of an example application flow generated by the system for a calendar entry. These screen shots can be generated by processors or circuitry in the PSN and on displays viewable by the parent users.

FIG. 15A shows a calendar function display be selected by a user at a home page of a user including pending invitation(s) and a calendar listing. The calendar can include events for the children such as activities and school. The calendar can also include parent activities that relate to the child or the child's activities, such as parent teacher meetings, meeting to support children activities.

FIG. 15B shows an invitation page for the calendar function on a display. The invitation page shows the details of the event, such as title, date, time, location, parent in PSN that are invited, and comments. The user has the option of accepting the invitation, commenting or declining the invitation.

FIG. 15C shows an invitation accepted page for the calendar function on a display. The event is entered into the parent's calendar on the PSN. The PSN can also send the event data to the parent's personal calendar on other communication sites, e.g., on the parent's phone, in Outlook, etc.

Figures 15D, 15E, 15F:
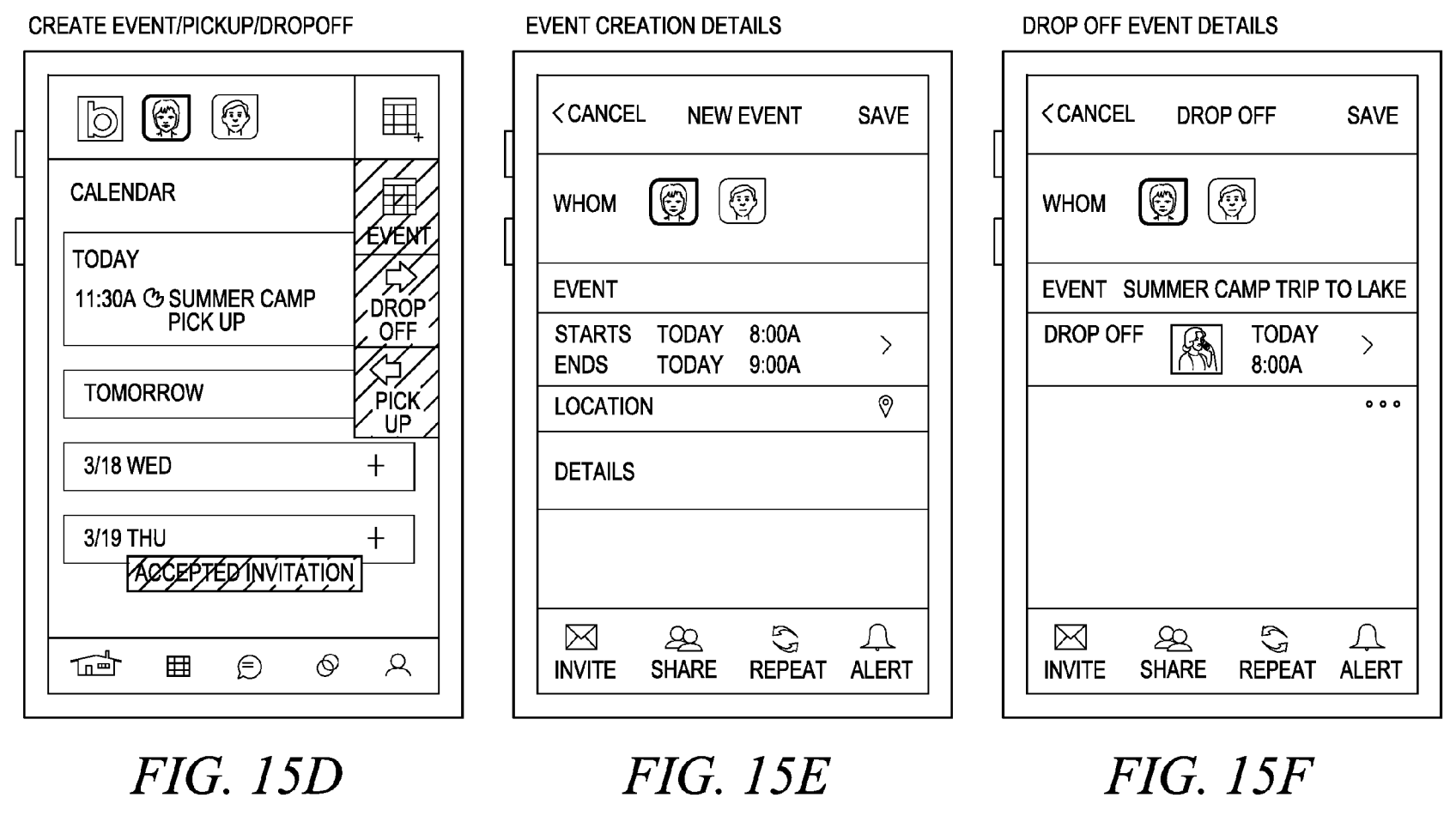

FIG. 15D shows an accepted invitation page with the option to create a drop off or pick up task associated with calendar event. Such a drop off or pick up can also be extended to other parent contact or to the parent's spouse. The event thus includes the child transport information.

FIG. 15E shows a screen shot of an event creation page. A new calendar event is created and includes selection of which child is associated with this event, the name of the event, the location of the event, the begin time and the end time of the event and other details or comments as appropriate.

FIG. 15F shows a screen shot of drop off and pick up tasks for the calendar event can be set FIG. 15G shows a screen shot of setting recurring settings for the event. Many child events are recurring, e.g., music lessons every Wednesday, volleyball practice on Tuesday, after school tutoring on one a month on the second Thursday. The parent can set the whether the event being created is recurring.

FIG. 15H shows a screen shot of an alert function for the event. The alert function can be at the time of the event, a set time before, minutes, hours, day or days.

FIG. 15I shows a screen shot of a share event function. The event can be shared with other linked parents or within a circle.

FIGS. 16A-16I show screen shots of an example application flow generated by the system for a teacher initial experience. The teacher functions can be implemented in the PSN.

Figures 16A, 16B, 16C:
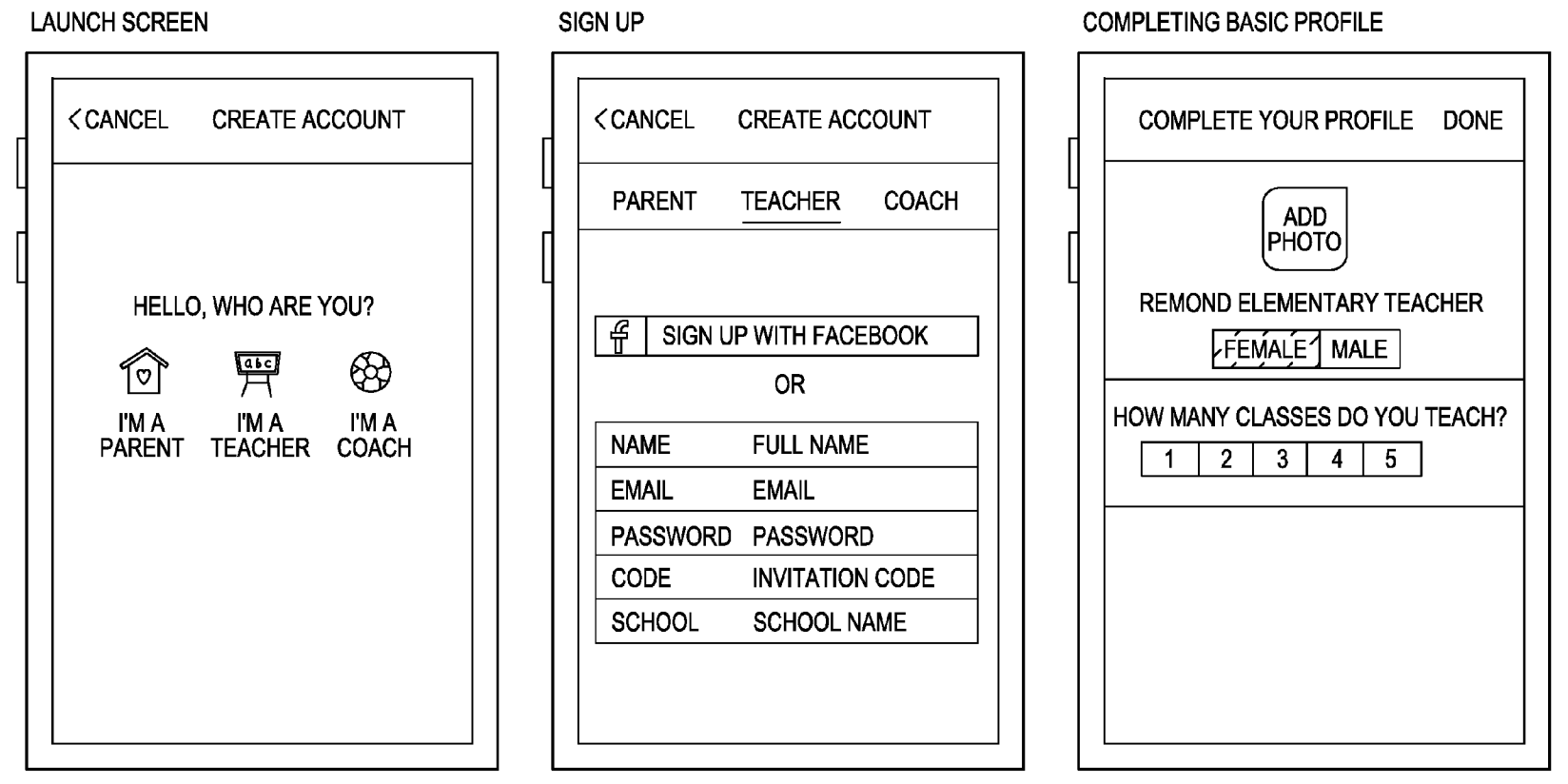

FIG. 16A shows an account creation screen shot. This screen can be used for a teacher, a parent or a coach as shown and may include other titles for various children activities as well. In the example, the teacher selects the "I'm a teacher" icon to launch the teacher account creation.

FIG. 16B shows a screen shot of a teacher creation page. The teacher account creation page can be similar to the parent creation page. The teacher can either sign up using another social network, e.g., Facebook, or enter the identifying information manually. The identifying information can include name, email, password, code, and school.

FIG. 16C shows a screen shot of a teacher information entry page. The entry page allows the teacher to load a picture, designate man or woman, and indicate how many classes are taught by the teacher. The number of classes can be used by the PSN to establish distinct circles for each class.

FIG. 16D shows a screen shot of a teacher account entry page. The PSN can automatically create the class circles, which can be listed on this page. The teacher can select a class circle.

FIG. 16E shows a screen shot of a teacher account entry page for inviting parents into a class circle, which could have been selected in the prior screen. In the illustrated example, the teacher can also name the circle and input data relating to the circle. Examples of data include grade, subject, co-teachers, and student names.

FIG. 16F shows a screen shot of suggested parents to add to the circle being selected by the teacher. The PSN searches its database to provide the suggested parents for the class circle being created. The teacher can select multiple parents to add to the circle. In an example, the PSN can also update the list of suggested parents based on selection being made by the teacher. That is, the PSN uses the data linking parents together to along with the selections by the teacher to refine the list of suggested parents to add to the class circle.

Figures 16G, 16H, 16I:
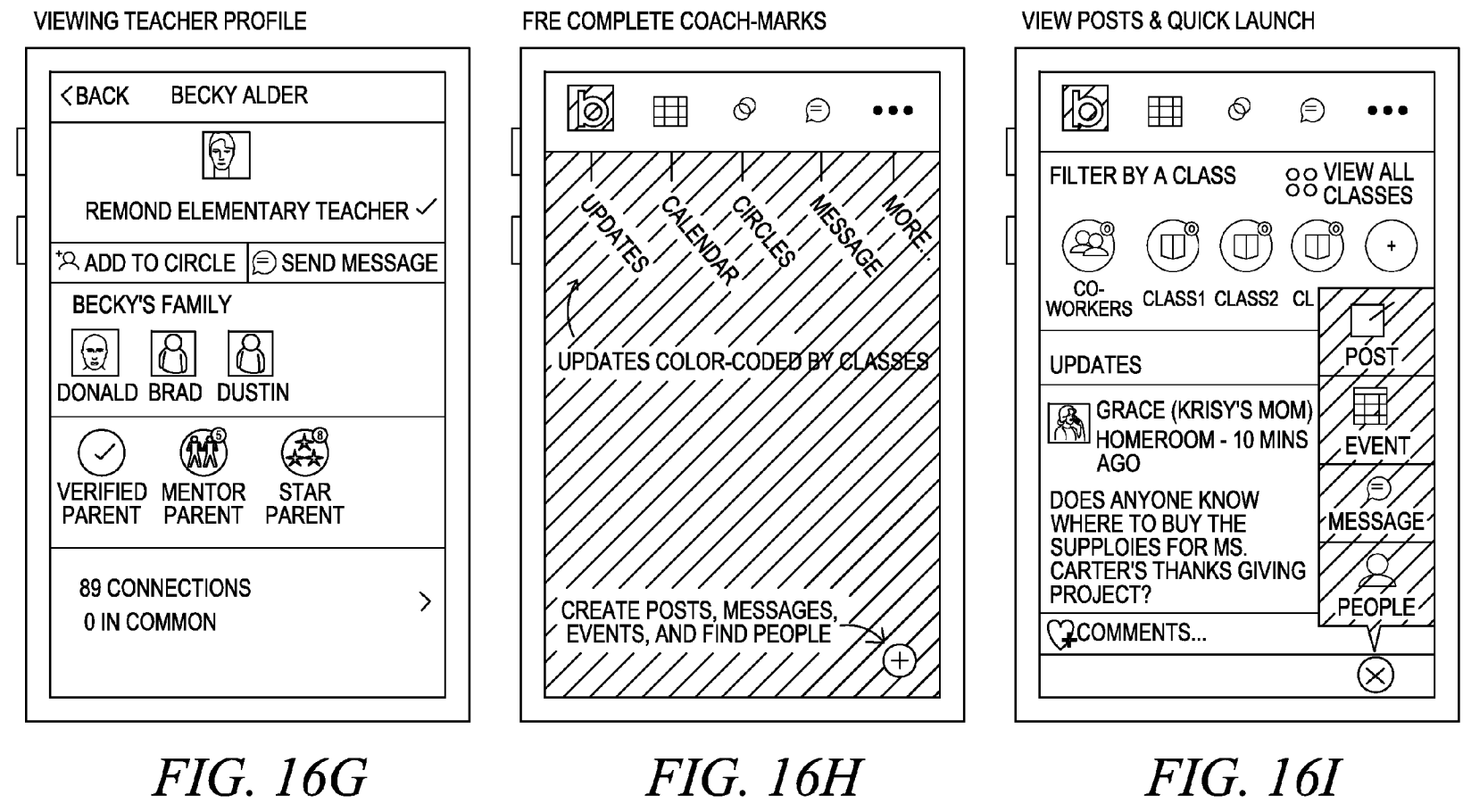

FIG. 16G shows a screen shot of a teacher account page. The display shows the name, picture, family, circles and connections of the teacher. The teacher can select the family member(s), circles or connections to establish further connections. As stated herein, the PSN can limit the ability of the teacher to follow other people's connections to a first level connection or a second level connection.

FIG. 16H shows a screen shot of a teacher account completion page. The completion page allows the teacher to select updates for various sub-accounts, e.g., updates, calendar, circles, messages and more. There is also a create icon to launch the creation posts, or any other sub-account.

FIG. 16I shows a screen shot of a teacher account allowing entry of an update or creation in any of the sub-accounts. In the illustrated example, the updates or messages associated with the teacher's circles.

All of the above screen shots and displays can be generated by the PSN using data stored therein based on the instructions also stored in the PSN.

The user devices 152 can receive data from the layers 108, 110 that was processed using instructions of methods described herein with reference to FIGS. 13-16. The processing can be performed, at least in part, by layers 102, 104 and 106. The user devices 152 can also send input from parents to the layers 108, 110 for further processing in layers 102, 104 and 106. In some examples, some instructions are carried out on the user devices 152.

Figure 17:
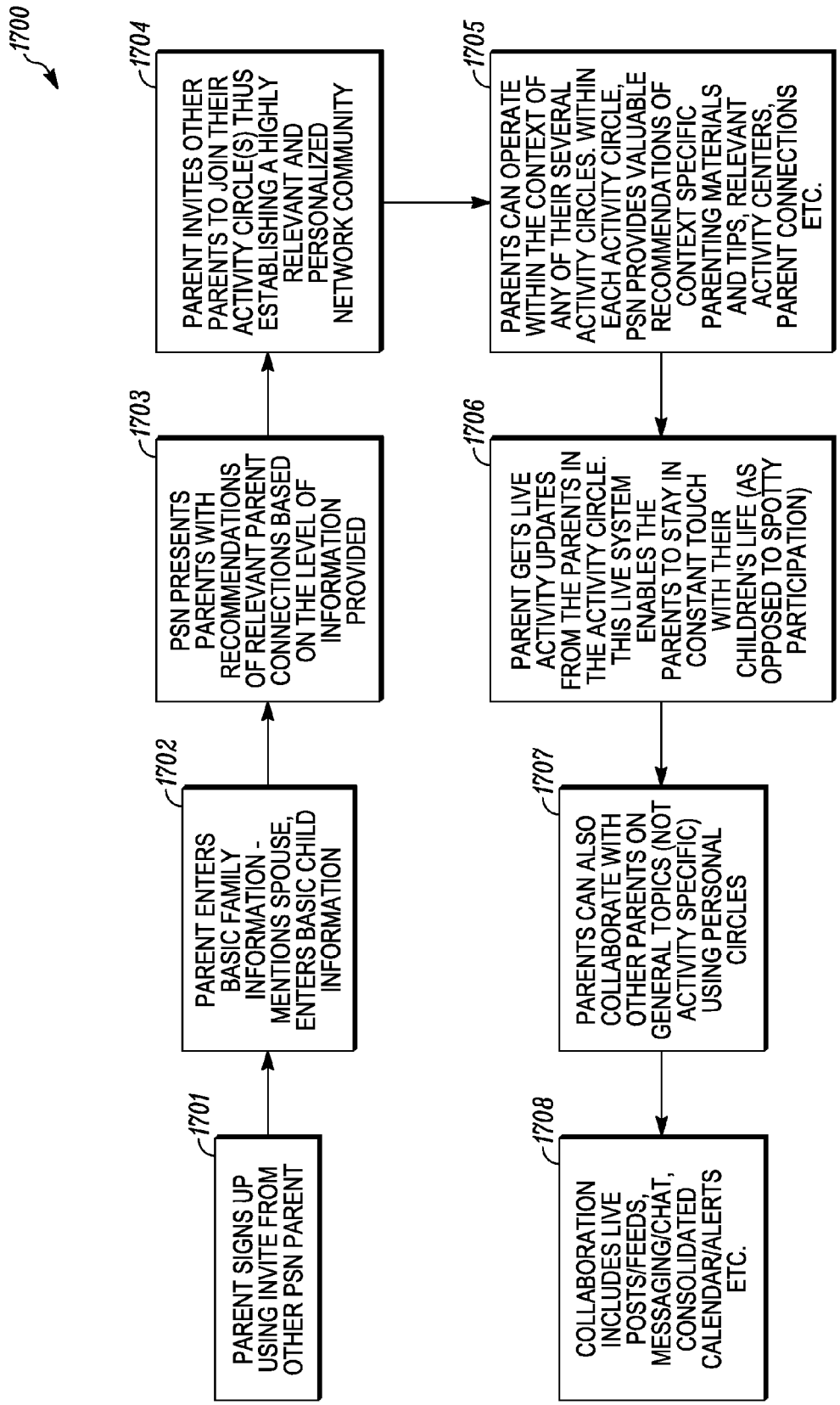
FIG. 17 shows a method flow for creating school based circles according to an embodiment.

FIG. 17 shows a method 1700 for a parent using the social network system according to an example, which can be executed in the PSN. At 1701, a parent signs up for the PSN upon receiving an invite from parent already in the PSN. The parent sending the invite may have a child with a relationship with the invented parent's child, e.g., same class, same activity, same interest.

At 1702, the invited parent enters identifying information for him/her and information about the family, e.g., the children, into the PSN. The PSN can provide a form to the parent's device. The PSN can store this data in memory or in a database.

At 1703, the PSN sends the parents recommendation(s) of relevant parent connections and circles. The PSN determines recommendations using the information provided by the parent and using information related to the parent's child (ren).

At 1704, the parent can invite other parents to join the parent's circles or connections. This creates for context to the PSN to recommend other circles or connections. The circles can be based on individual activities of the child.

At 1705, a parent can operate within the context of any of their circles, which represent the activities of their child. Being in an activity circle provided the PSN with context as to a child's interests and activities to be used in providing further recommendations to the parent. The PSN can also use this information to provide recommendations to the parent regarding parenting materials, resources, additional activities, relevant activity centers, parent connections, carpooling, etc. For example, the PSN can recommend activity centers that are used by other parents without revealing data or information about the other children or without revealing names of the parents involved with the activity center. Thus, a secure, relatively private recommendation network can be set up for parents.

At 1706, the PSN can provide the parent with a continuous feed of updates from parents in the circles in which a parent is a member. Such a live feed system enables the parents to stay in contact with other parents and their own children. The parent can also post updates to contact parents of children with children in the same activities as the parent. This is an efficient communication method that encourages parents to communicate and be involved.

At 1707, the PSN can provide a medium for the parents to contact each other on general topics as the parents have established a relationship through be members of a same circle. These interactions need not be activity specific. In an example, the PSN can provide a means of communication outside the circles, e.g., messaging, direct updates, etc.

At 1708, the PSN provides collaboration between parents outside the circles. The collaboration can include live posts, feeds, messaging, chat, a consolidated calendar, alerts and the like. These types of collaboration can also be done in the circles as well.

The user devices 152 can receive data from the layers 108, 110 that was processed using instructions of methods described herein with reference to FIG. 17, e.g., parent/user processes. The processing can be performed, at least in part, by layers 102, 104 and 106. The user devices 152 can also send input from parents to the layers 108, 110 for further processing in layers 102, 104 and 106. In some examples, some instructions are carried out on the user devices 152.

Figure 18:
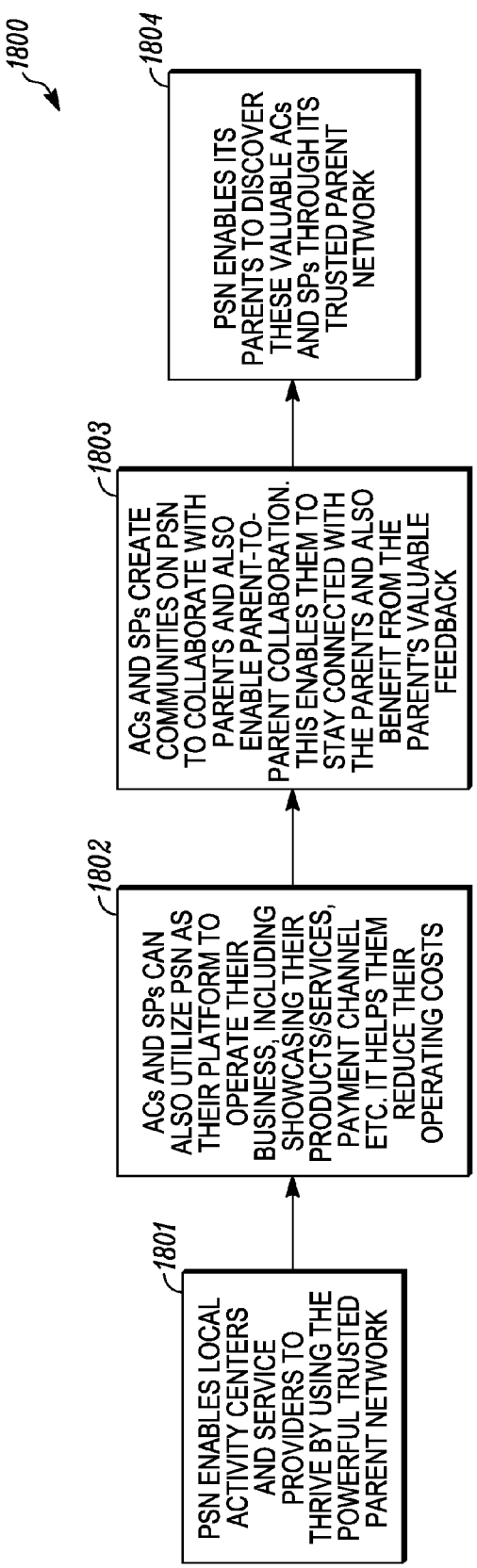
FIG. 18 shows a method flow for the social network system according to an embodiment.

FIG. 18 shows a method 1800 for a use case for the social network system according to an example. At 1801, the PSN can provide activity centers the ability to contact consumers who are interested in their services and products. The PSN can filter the possible contacts by location. For example, PSN will not recommend a dance school in Michigan to parents located in the Washington. Moreover, the PSN is a trusted parent network that can base recommendations on actual use by parents in the network outside of paid advertising.

At 1802, the activity center and service provider can use the PSN as a platform to operate parts of their business. Examples of operation can include showcasing products and service, payment channels, provide their activity in general, and provide updates/news related to their business. The PSN can help an activity center reduce costs and be more efficient.

At 1803, the activity center or service provider can create their own circles to develop a community and collaborate with parents. This circle can allow parents to communicate with each other on topics related to the activity center or service provider. This allows the activity center or the service provider to stay connected to parents and benefit from the parent's network and the parent's feedback and input.

At 1804, the PSN also stored data that can be searched by parents to discover an activity center or a service provider. When being searched by a parent on the PSN, the PSN can provide parent reviews and how the parent network uses the activity center or the service provider.

PSN for activity centers and service providers provides can operate to increase reach; retain satisfied parents; build a reputation; to generate more leads though localized, trusted recommendations from parental network in the PSN, which can be a good way to build more business; increase parental engagement by keeping existing parents happy; build recurring business with better parental connection throughout the service delivery; build reputation on the World Wide Web through ratings from the network of parents that influence choices of many other parents. This data can be shared by the PSN to parents in the social network identified to be of interest.

Figure 19:
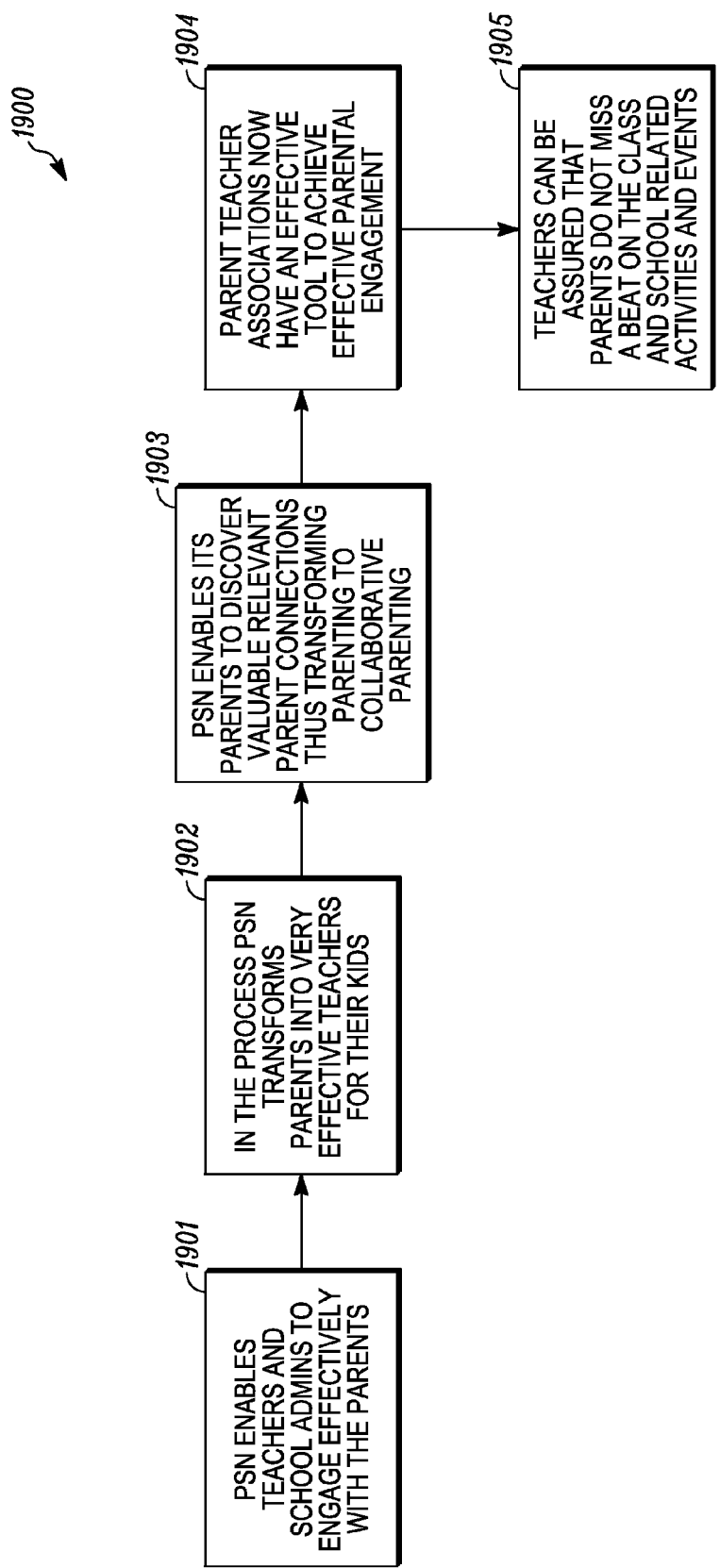
FIG. 19 shows a method flow for the social network system according to an embodiment.

FIG. 19 shows a method 1900 for a use case for the social network system according to an example. At 1901, the PSN can provide a communication platform for teachers, administrators, or school systems. At 1902, the PSN, e.g., using circles, allows the parents to stay up to date on the child's educational environment. The PSN provides an easy way for teachers to contact the parents. At 1903, the PSN enables parents on the PSN to discover relevant parent connections and recommendations to develop collaborative parenting. At 1904, the parent/teacher organization can also us the PSN to contact parents. At 1905, the teachers, school or administrator can be sure that the parent receives the information as they are communicating directly.

PSN can provide various functions and benefits for a schools and parent-teacher groups, e.g., providing true collaboration between parents and teachers; increasing parental engagement at both class and school level; increasing the drive for student achievement; making it easy to reach parents using BPN's secure and social network; using BPN's mobile and WWW communication channels to keep parents are always in touch with their network; advertising for volunteers in social and curricular activities; providing parental resources; and organizing events The user devices 152 can receive data from the layers 108, 110 that was processed using instructions of methods described herein with reference to FIGS. 18 and 19, e.g., use case processes. The processing can be performed, at least in part, by layers 102, 104 and 106. The user devices 152 can also send input from parents to the layers 108, 110 for further processing in layers 102, 104 and 106. In some examples, some instructions are carried out on the user devices 152.

The PSN can also provide methods for moderating content on the network. The PSN can allow the users the methods to flag a post, flag a comment, remove a post, remove a comment, Mute/un-mute personal connection and group (community) member, unfriend or unlink an individual in my network, remove group (community) member.

A user can flag a post using a post options drop down menu. The flag a post feature is available to all users. Flagging a post is available on any post that had at least one group in the recipient list. So a post made to one group and three individuals can be flagged by any of the recipients including the three individuals. The group members can flag it from the group or from their personal feed. When a user flags a post, the post should be removed from that user's feed; a confirmation should be shown, just for that user. The PSN does not change the message for others. The confirmation can state, e.g, "Post has been reported to Admin and removed from your feed." To flag a post, an option "Flag Post" selectable icon can be added to any post or a page.

A user can remove a comment in the PSN. Users can hide any comment from their personal feed as well as from a group area in which they are a member. Doing so will remove it from both the personal feed area as well as the group area. This can be limited to just what that user sees. An administrator can hide a comment similar to any user.

A user can also mute/un-mute a personal connection or a and group (community) The PSN can allow a member to mute/unmute personal connections or members of a group of which they are a par. Muting will result in the PSN not showing the user any posts made by the muted user except the ones that was made directly and only to the recipient and his/her spouse. Muting will not mute any comments, calendar related items or messages. Users can mute from a post they send or with a "Mute {sender first name}" selectable link, or from their profile. Similar to the Edit profile, the PSN can allow muting, when a members profile is visited from a group/community, visiting a user's profile from outside should also have an "Edit" option. Clicking on Edit should have an option to "Mute { firstname}." Muting does not show the membership settings as that is relevant only in the context of a group/community.

The PSN can show a muted user(s), with an indicator or label in their view profile page to indicate that they have been muted.

When a user mutes members of a group, the PSN does not showing any posts made by that user except the ones that was made directly and only to the recipient. The PSN does not mute any calendar related items or messages. The PSN allows users to mute from a post they sent or from their profile accessed from within the group. The PSN allows a user to "unmute" muted friends from their profile accessed from within the group. The PSN allows a circle, community or group administrator the ability to mute or unmute a member for the entire group. This can be done when a profile accessed from within the group. A muted group member is only able consume data in the group, e.g., posts, events, messages, etc. In an example, the muted member cannot respond or post. The PSN will notify administrators of muted members, e.g., an email notification should be sent to the muted member notifying that the member is muted along with the reason that the administrator entered, if available or a member listing page should indicate muted members only to the administrator. This can be similar to how the special roles are indicated. When the member enters the group area a banner should be displayed just for him indicating that he has been muted in the group and allowing him to message the administrator. The banner or message can read, e.g., "Your privilege to communicate in this group has been put on hold. Please contact the administrator." The PSN can provide an indicator or label in the muted user's view profile page to indicate that they have been muted.

The PSN can allow users to unfriend an individual in their network of groups, connections, links, circles, communities. The PSN can removing each other from the others friends lists; disabling ability for them to post or event invite each other. Note that the past posts and events would still be shown but they wouldn't be able to comment/like on those. The PSN allows them to message each other, to "Unfriend" from their profile, to "Unfriend" muted friends from their profile.

The PSN can allow an administrator the ability to remove a group (community) member. The removed user would have to re-request.

Figure 20:
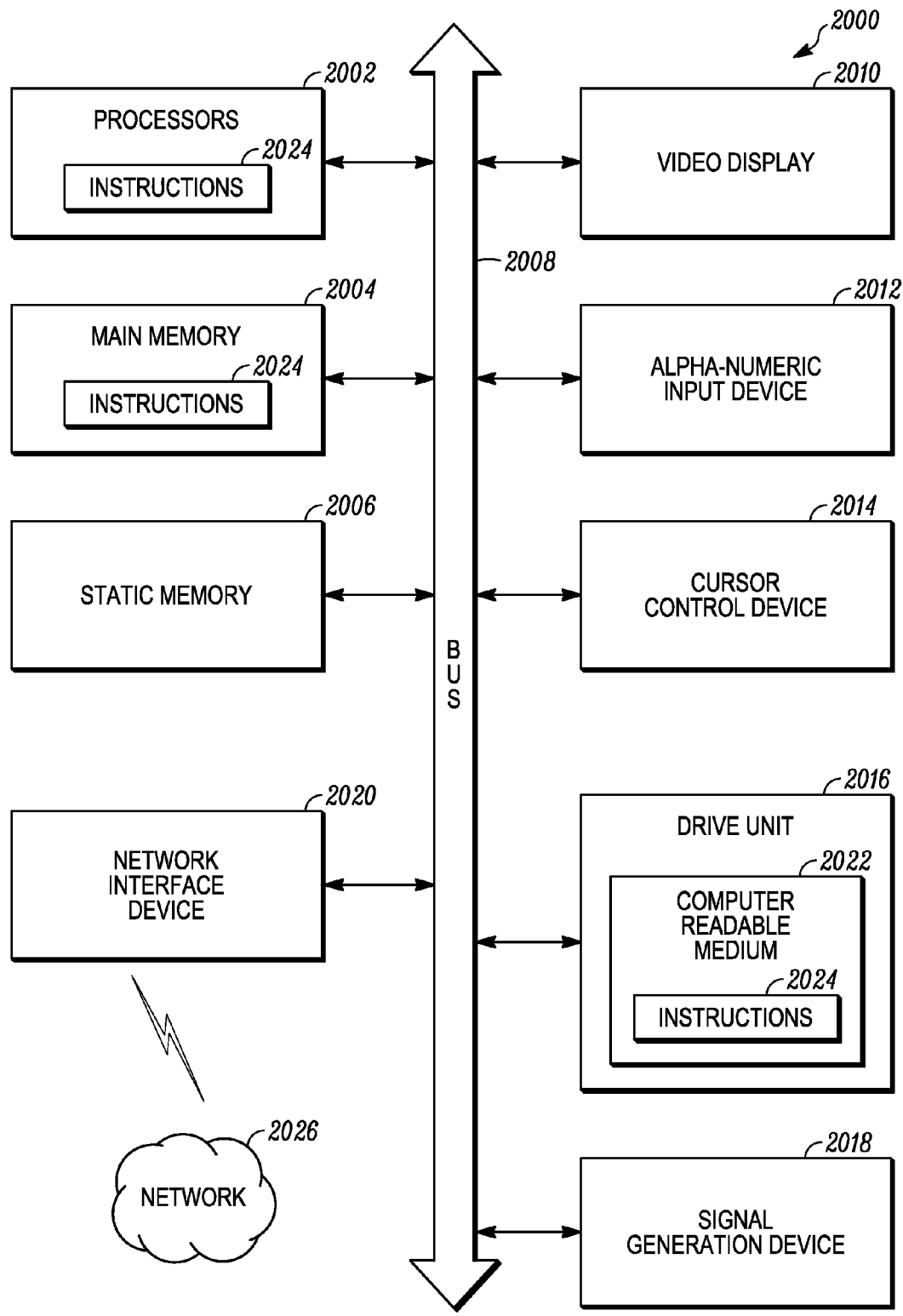
FIG. 20 shows a schematic diagram of system that can perform the methods and functions according to various embodiments

FIG. 20 shows a diagrammatic representation of machine in the example form of a computer system 2000 within which a set of instructions may be executed causing the machine to perform any one or more of the methods, processes, operations, or methodologies discussed herein. The parent social network or components thereof may operate on or more computer systems 2000. Such a computer system 2000, when executing the method steps described herein, is a dedicated machine designed for executing the steps described herein.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2000 includes a processor 2002 (e.g., a central processing unit (CPU) a graphics processing unit (GPU) or both), a main memory 2004 and a static memory 2006, which communicate with each other via a bus 2008. The processor 2002 includes circuitry to execute the method steps described herein. The memory 2004, 2006 includes circuitry to store the method steps and data relating to the parent social network. The computer system 2000 may further include a video display unit 2010 (e.g., a liquid crystal display (LCD), plasma display, LED display or a cathode ray tube (CRT)). The computer system 2000 also includes an alphanumeric input device 2012 (e.g., a keyboard), a cursor control device 2014 (e.g., a mouse, pointer), a drive unit 2016, an audio signal generation device 2018 (e.g., a speaker) and a network interface device 2020.

The drive unit 2016 includes a machine-readable medium 2022 on which is stored one or more sets of instructions (e.g., software 2024) embodying any one or more of the methodologies or functions described herein. The software 2024 may also reside, completely or at least partially, within the main memory 2004 and/or within the processor 2002 during execution thereof by the computer system 2000, the main memory 2004 and the processor 2002 also constituting machine-readable media. The software 2024 may further be transmitted or received over a network 2026 via the network interface device 2020, e.g., in any machine readable form.

While the machine-readable medium 2022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the embodiments of the present invention. The term "machine-readable medium" shall accordingly be taken to include, but not be limited to, solid-state memories, optical and magnetic media, and carrier wave signals that are of a form that are machine readable.

The PSN can provide circles and communities. A circle can be a list of connected parents. The idea is for a user (parent) to be able to create personal circles based on purpose of interaction. For instance, a parent can create a circle to interact with other parents whose children also attend the same school as my child. The PSN provides a platform the parent to create this circle is to keep him/her abreast with activities going on at the school level. Similarly, a parent can create a narrower circle with parents whose kids go to 4th grade Ms. Jones's class, i.e., the child's class. Here the idea is to focus parent interaction to the class level activities. Though the intent of circles is to interact within a context (school, class, activity), note that circles are simply tags and may not be dynamically and strictly defined by the circle attributes. For example a circle may have only two parents, which would be a line and not a circle. So, a parent for some own valid reason can decide to invite/add a parent from a different school (School B) circle to his school (School A) circle. Also note that circles are personal lists that only the user can see. For instance in one example, Parent A can have a circle named "Ms. Amanda 4th Grade" and have 5 parents in the circle while Parent B can have a circle with the exact name but with a different set of parents.

In order to encourage parents to network with others in the PSN, in one embodiment the system automatically creates circles for every activity they add to their child. In one embodiment, by default spouses are added to every system-created activity circle. In another embodiment, the system will automatically recommend/suggest connections for a circle if there is enough meta data to do so, the PSN determines a connection of a connection is a likely connection for a parent. In one embodiment, the user can delete any circle including system-created ones. In one embodiment, the user can also change the name of a system-created circle.

Besides the system-created circles, the user can manually create personal circles and invite other parents to it. Recommendations for personal circles (parents you may know) will be based on the number of common friends you and another parent (with whom you still haven't connected) have. For instance if there is another parent in the PSN network with whom you haven't connected yet, and the two of you have five common friends then that parent will be recommended to you within a personal circle by the PSN.

The PSN can create a community. These are communities represent a formal group. For instance there can be a community created for a school or a class within a school. However, a circle and a community are different in the PSN. Circles are personal to each user; community is a public entity and is single instance. A community is usually created, managed and moderated by users who have the appropriate credentials. For instance a class or a school community can only be created by a teacher of the school. Generally a parent shouldn't be able to create a school or class community. Besides being invited to join a community, users can seek to join a community. A community can be open or closed. Any user can readily join an open community, whereas membership to closed communities works based on invitation/approval.

The PSN can provide a platform for personalized recommendations. One of the features of the PSN is the recommendations it offers to the parents. Broadly, there are two categories of recommendations, parent recommendations and resource recommendations.

In an embodiment, the PSN can include an algorithm of instructions that provides a list of "recommended parent connections". The PSN can make these recommendations based on various criteria such as child needs or requirements, interests, profile match etc. Such recommendations can help the parent to discover relevant and valuable parent connections that the parent would otherwise never be able to find. These recommendations happen at several points in the PSN such as:
  a. within the specific context of an activity circle, recommendations are based on the depth of details (attributes) available to the system;
  b. when parents explore activities or activity centers, the PSN can track and use this data to recommend to other parents;
  c. when parents specifically seek help on a particular topic, e.g., by searching the PSN; and
  d. when parents show interest in a particular activity.

The PSN can provide resource and activity center recommendations. Similar to parent recommendations, the PSN is also capable to present recommendations on relevant resources throughout the system. These resources would include relevant activity centers, helpful parenting materials, tips etc.

Here are a few scenarios where the PSN will provide recommendations. In one example, parent signs up and provides only the mandatory the child information (age & gender). The PSN recommends based on location, age and gender. Note that the following example will be shown only if the PSN can find any.

1. Parent: "There are 400 parents similar to you on PSN in Redmond. Click here to find the most relevant ones!" message can be shown by the PSN. Alternatively show the number of parents by grade, 40 Kindergarten, 76 1st grade, 85 2nd grade. The parents can then click on the group they are interested in to see the list of parents. The parent can then invite the parents. Note: if the system is unable to guess which child, then the PSN can ask them which of their children attend that grade, else the PSN simply ask them to confirm that the child (determined by the system) attends that grade.

2. Resource: The PSN recommends useful parenting materials and tips based on age and gender.

3. Activity centers: The PSN can recommend relevant activity centers. In an example, parent mentions an activity of interest for a child but no location (e.g., an activity circle). 40 at Universal Martial Arts, 76 at ABC Karate center. The parent can then click on the group they are interested in to see the list of parents. They can then invite the parents. The PSN ask them to confirm that their child attends that center.

In an example, parent accesses their personal circles on the PSN. The PSN can show them who their friends are connected with, e.g., "There are 400 parents in your Friends' network. Invite them to your network!" In another example, In an example, the PSN can show a message of "Many of your connections have read these:" or a similar message. The PSN can then show the parent a list of parenting materials and tips read (clicked) by at least a certain number or percentage of connections on the PSN, e.g., at least 40% of the connections. In an example the PSN can show a message that is not entire connection based but circle based. The message can be "Many of your connections in {name of circle} have read these:" The PSN can then show the parent a list of parenting materials and tips read (clicked) by at least a certain number or percentage of connections in that specific circle PSN, e.g., at least 40% of the connections in that circle.

In an example, the PSN can determine recommendations on activities and activity centers, and can show a parent the number of other parents by activities. For example the PSN can show a parent sub-groups by activity centers, e.g., Dance: 35 at Let's Dance Academy, 24 at HipHop Dance School; Karate: 40 at Universal Martial Arts, 76 at ABC Karate center . . . . They can then click on the activity or center to add it to their child's profile.

In an example, parent goes into one of their activity circles. The PSN can show the parent who their connections are connected with. For example, the PSN can send to a parent's device the message "There are 400 parents in your connections' network. Invite them to your network!".

The PSN can also create a smartfeed to a parent's device, which can include PSN generated posts that are personalized to the parent. The end goal of PSN smartfeeds is to constantly improve the personalized value the PSN provides to parents thru intelligently selected recommendations. The smartfeeds from the PSN need not be limited to the parent's connections. The PSN has the ability to discover the exact connections and resources the parent intends to use or may wish to be connected. In an embodiment, the smartfeed posts will be posted along with the regular posts (from other parents etc.). Broadly, there can be at least two categories of smartfeeds from the PSN. One category of smartfeed posts will be tips or tidbits with information relevant to the parent based on the parents activity, connections, and children related data in the PSN. The other category of smartfeed posts will have tips or tidbits with general information and will be triggered at appropriate times. These will further seek key inputs from the parent in order to provide them back with relevant valuable information. PSN smartfeeds are further explained in the below table.

| SmartFeed Attribute | SF Trigger | SF Frequency | SF Text | SF Question type | SF Subsequent/ Other Actions | Comments |
|---|---|---|---|---|---|---|
| member name (First & Last) member dob (year optional) member gender | no trigger | n/a | n/a | n/a | n/a | n/a |
| Member location - city, state | | | | | | As part of FRE, atleast city & state or zip is mandatory. |
| member marital status | | every 10 logins? | "Having spousal support for parenting is extrmely effective. xx % of parents on Bloomz have benefitted from having spousal support. Click here to extend your benefits on Bloomz.." or "Do you have a Spouse/Partner. Bring them into Bloomz to expand the Parenting horizon" | navigate to spouse details entry control (manage profile). seek status and spouse details (name, gender, dob). | Provide an Invite Spouse button. Once the Spouse has been identified, right there we could suggest the spouse's connections to the user. | |
| spouse name spouse gender spouse dob (year optional) | | | Same as member marital status | | | Default to the opposite sex. |
| member primary email | Upon signon (only for native) | every 10 logins | "Please complete your contact details so you can retrieve your forgotton password with ease." | data entry shown in a popup. Email should be shown before phone numbers. User should be able to "Skip" or close popup. | | |
| member secondary (other) email? | | | Same as member primary email | | | |
| member mobile number | Upon signon (only for native) | every 10 logins | "Please complete your contact details so you can retrieve your forgotton password with ease." | data entry shown in a popup. User should be able to "Skip" or close popup. | | |
| member mobile number - Scenario2 | no trigger | every 30 logins | Secondarily, we can also consider showing this message in SF - "Sharing contact details with select Parent friends will come in handy in a lot situations. You can do so securely thru Bloomz. Click | If number and/or email is already available then provide the friends list so the user can do multi-select and "Share Contact"?. | | |

| SmartFeed Attribute | SF Trigger | SF Frequency | SF Text | SF Question type | SF Subsequent/ Other Actions | Comments |
|---|---|---|---|---|---|---|
| | | | here to stay closely connected.." | | | |
| member home number | | | Same as member mobil number | | | |
| member picture | | | | | | |
| child name | | | | | | At least one child is mandatory as part of FRE |
| child dob year child dob month and day | | every 10 logins | "{kid's} DOB is incomplete. Providing the birthday helps you keep track of {kid's} progress and get age specific recommendations." | dob popup | In order to show the value immediately of asking the user to provide DOB, we can take them to a page showing "Suggested Activities for {Kid}". This becomes more valuable as the activity pool builds. | Other scenario to seek this info is when the user is browsing the "Activities Center" area (future feature), we can ask "Please complete the DOB information for your kid(s) in order to get specific recommendations." |
| child gender | | | | | | |
| child picture | | | | | | |
| activity | | once a month (since this particular SF went out.) | Are you forgetting any other activities of your kids? | navigate to activity entry control (type, location etc.) | As soon as activity is entered, based on location and activity a tidbit fadeout can be shown as "There are xx Parents whose kids are doing {activity} in {location}. By providing additional details on this activity you can find valuable connections specific to {kid's} {activity}. | |
| activity - Scenario2 | Parsing pasts: The system can keep monitoring and parsing the users posts for keywords that indicate acvity type keywords such as dance, chess etc. If a a 5 matches are found within a rolling 2 month period then an SF can be triggered. | | "You seem to mention {activity} frequently. Is this an activity you child is pursuing?" | yes/no inline in the feed itself. | As soon as activity is entered, based on location and activity a tidbit fadeout can be shown as "There are xx Parents whose kids are doing {activity} in {location}. By providing additional details on this activity | |

| SmartFeed Attribute | SF Trigger | SF Frequency | SF Text | SF Question type | SF Subsequent/ Other Actions | Comments |
|---|---|---|---|---|---|---|
| activity center | When the user makes a post for a particular circle or when they filter a particular circle to read its posts. | | "Do you want to get connected with other Resourceful Parents? Please tell us where your kid attends xxx or who the teacher/instructor is?". If the techer information is present then just ask for the center information. | navigate to activity entry control (type, location etc.) | you can find valuable connections specific to {kid's} {activity}. similar to above | |
| activity center - Scenario2 | Circle activity based (CAB) trigger: The moment a 3rd parent in the user's activity circle provides the center information which is missing in the user's activity, an SF can be triggered. | | "At least 3 of your friends in {kid's} {activity} circle attend {center}? Does {kid} attend here, too? | yes/no inline in the feed itself. If they answer no, then ask them to enter center in a popup. | similar to above | |
| activity teacher/coach/ instructor | When the user makes a post for a particular circle or when they filter a particular circle to read its posts. | | "Do you want to get connected with other Resourceful Parents? Please tell us who teaches {activity name} for {kid} {at center name (if center name is available)}". | navigate to activity entry control (type, location etc.) | similar to above | |
| activity teacher/coach/ instructor - Scenario2 | Circle activity based (CAB) trigger: The moment a 3rd parent in the user's activity circle provides the teacher information which is missing in the user's activity, an SF can be triggered. | | "At least 3 of your friends in {kid's} {activity} circle attend {teacher's} class? Does {kid} attend here, too? | yes/no inline in the feed itself. If they answer no, then ask them to enter teacher's name in a popup. | similar to above | |
| child school name | Age based: Based on the child's age, we can determine if the kid attends elementary, middle or high school. | Every 2 weeks (since this particular SF went out.) | "Where does {kid} attend school? Based on {kid's} age, we think s/he attends (elementary/middle/ high) school. Is this correct? (y/n)" | yes/no inline in the feed itself. If yes then show the list of appropriate (elem/middle/ high) schools based on user's location in either dropdown or radio button. If they answer | similar to above | |

-continued

| SmartFeed Attribute | SF Trigger | SF Frequency | SF Text | SF Question type | SF Subsequent/ Other Actions | Comments |
|---|---|---|---|---|---|---|
| | | | | no, then give them radio button for other 2 categories (elem/middle/high), aand then continue to get the school name info. | | |
| child school - Scenario2 | Friends based: Determine the majority school based on all the friends across all the activity circles of a particular kid. | Every 2 weeks (since this particular SF went out.) | "Where does {kid} attend school? Most of your friends children in {kid's} circle attend {school name}. Is this correct? (y/n)" | yes/no inline in the feed itself. If they answer no, then ask them to enter school name in a popup. | similar to above | |
| child grade | Age based: Assuming that we make birth year mandatory, the grade can be calculated based on the kid's age. | Every 2 weeks (since this particular SF went out.) | "Which grade is {kid} in? Based on {kid's} age we are guessing that {kid} attends one of the following grades, please confirm!" | Show radio button with calcualted grade, cg − 1, cg + 1. | similar to above | |
| child grade - Scenario2 | Friends based or CAB trigger: If school name is not provided, then determine the majority grade based on all the friends across all the activity circles of the particular kid (Friends based). If the school name is present, then detertmine the majority grade of all the kids in teh school circle. | Every 2 weeks (since this particular SF went out.) | "Which grade is {kid} in? Based on your friends children's grade, we are guessing that {kid} attends {grade #} grade, please confirm!" | yes/no inline in the feed itself. If they answer no, then ask them to select grade from dropdown list. | similar to above | |
| child grade - Scenario3 | If we don't make the birth year mandatory, and if kid's age has not been provided yet. | Every 2 weeks (since this particular SF went out.) | "Bloomz has some valuable resources/parent connections waiting for {kid}. To receive specific recommendations, please tell us which grade {kid} attends." | show grade dropdown list in popup. | similar to above | |
| child school teacher | When the user makes a post for the school circle or when they filter posts (to read) just for the school circle. | | "Want to get connected with other Resourceful Parents! Please tell us who teaches {kid} {at school name (if available)} ". | | similar to above | |
| child school teacher - Scenario2 | Circle activity based (CAB) trigger: If class circle is available choose that circle else | once a month (since this particular SF went out.) | "At least 3 of your friends in {kid's} {school/class} circle attend {teacher's} class? | yes/no inline in the feed itself. If they answer no, then ask them to enter | similar to above | This needs to be reset every school year. |

| SmartFeed Attribute | SF Trigger | SF Frequency | SF Text | SF Question type | SF Subsequent/ Other Actions | Comments |
|---|---|---|---|---|---|---|
| | choose school circle in the chosen circle (class or school), the moment a 3rd parent in the circle provides the teacher information which is missing in the user's activity, an SF can be triggered | | Does {kid} attend the same class, too? | teacher's name in a popup. | | |

In an embodiment, the PSN does not seek inputs that do not translate value for the parent. Each parent/child is different, so rather than having a standard template to seek all the inputs upfront to complete the parent/child profile, the PSN uses smartfeeds to seek the relevant inputs only when it feels that there is a value it can provide to the parent because of that particular input. There are various scenarios under which the inputs are sought and the value the parents get out of the smartfeed.

Another feature of the PSN is recognition badges. Recognition badges can include both achievement badges and appreciation badges. The PSN lets users recognize and appreciate a particular user's achievement or contribution by letting them award "recognition badges". Such tokens will be maintained in the user profile and can be made visible to the others users. Examples of PSN recognition badges can include, but are not limited to, parents awarding their own children; parents awarding other their friend's children or connection's children; parents awarding other peer parents; parents awarding mentors; parents awarding teachers; teachers awarding parents; mentors awarding junior parents; the PSN awarding parents for feedback and use of the PSN; etc. Badges can be icons stored in the PSN and displayed publicly or privately on the user's profile in the PSN. Example of badges can be champion parent, model parent, star parent, helpful parent, and knowledgeable parent.

The PSN can also recognize various skills being shared by parents on the PSN with other parents. Parenting is both an acquired and a developed skill With time parents become more seasoned in parenting. PSN provides a platform to enrich the parenting skills of parents. There are several such experienced parents who can and would like to help the other less experienced parents. PSN provides the ability for seasoned parents to contribute to the community by serving as mentors. PSN provides a system to transform parents to a status of mentor parents in a systematic manner. Over time the PSN community automatically identifies and accredits such parents. Accreditation in the system happens using a combination of PSN badges and user reviews on the parent who can become a mentor. For instance, parents can earn credentials by peer nominations ("mentor nominations" badge). On PSN, mentor parents will be able to volunteer themselves as mentors for junior parents who can benefit from the experience of those parents and facilitate collaboration for those mentoring discussions. PSN allows parents to easily discover and identify these mentor parents. The PSN can recommend mentor parents to junior parents based on circles. Parents can then connect with the mentors to get guidance on specific or general parenting topics thus gaining instant access to wealth of parenting experience. By enabling parents to recognize their own potential in parenting skills, PSN serves as a platform for such mentors to transform into professional parenting experts. PSN provides a platform for parents to enrich their parenting skills and flourish as mentor parents.

The PSN can also recognize parenting experts, e.g., with badges. Using its communities and/or circles, PSN enables both professional parenting experts or any popular parent with a following to provide expert guidance or advice to other parents. The PSN can provide an ability to recognize PSN approved parenting experts to publish parenting articles/blogs etc. to the PSN community. Such parenting experts can also funnel their content from external systems into PSN using communication channels, e.g., PSN application programming interface (API). PSN provides parents the ability to follow or subscribe to such parenting experts. By following the parenting experts, parents will automatically receive the parenting expert's articles as posts or feeds. The PSN can also provide the ability for parents to connect with the parenting experts on a personal or direct basis for specific parenting advise.

The PSN also provides the ability to follow a child. A child can look up to or respect another child, such a child can be considered a role model. A child who is looked up to can be an older child, i.e., a senior child, or a peer child. PSN can provide the ability for a child to keep track of the progress of their role models thru their parents. PSN provides the ability for parents to allow their close friends/family, e.g., connections on PSN, to follow their child in a highly controlled and secure manner. The parent is granted total control on what aspects for which they would like to give permission when someone wishes to follow their child. PSN can only allow those people approved by the parent to follow their child.

The PSN includes secure user profiles and data. PSN ensures security when it comes to user profiles, e.g., it limits who can see what in a particular user profile. It achieves this in two ways—default setting based on the role and connection, and further by allowing the user to tweak the security settings themselves. An example of a default setting by role and how users are connected.

The PSN is a leading social network for trust & safety as it relates to access by other adults to information about minors. The PSN can operate as an invitation only network. The growth of the network will be through viral building of networks. PSN can leverage existing Facebook network to establish parent to parent connections using child data. PSN can create partnerships with schools, activity centers, and existing parent networks to seed at various places.

The PSN can lead in privacy efforts. PSN uses global circles, activity circles and private circles. Each of these types of circles can have their own privacy rules. For example, activity circles can be controlled with a level of access for effective coordination, calendar and knowledge sharing for only those involved with that activity. Global trusted circles can be controlled for only trusted family and friends to be engaged more closely. Private circles can be controlled to facilitate best practice sharing while keeping the children's information discrete. The control can be performed by allowing users to set control setting for their circles and in their accounts. The control setting s can be stored in the PSN and accessed by the processing circuitry each time a circle is accessed or requested by a user. In an example, a user has complete control over privacy settings.

The PSN can also provide security. The PSN can use at least two-factor authentication for web access. The PSN can use salted passwords with encoding. The PSN can use secure HTTP for password access. The PSN can use double login for editing profiles.

The PSN can provide a system and a method to provide for volunteer organization. Teachers, parents, coaches and leaders at activity centers frequently have to seek volunteer help from the parents for their class needs, events, games, and activities among others. The PSN can provide an easy way for them to perform the task of organizing and manage volunteer(s). The PSN can organize volunteers using the calendar event functions of the PSN and can have a schedule, which can be stored and processed in the system 100 or 200. In some examples, the volunteer requests may not have a particular schedule, e.g., a teacher could publish a "class supplies wishlist" volunteer request, which is an ongoing request and not tied to a specific date or event. A volunteer request function typically has a schedule, which can be created, modified and stored in the PSN. The volunteer request can require one or more people requests or one or more item requests, or a combination of both. Note that each people request or item request could have a schedule for itself. For example, a volunteer request could be created by the host for a class birthday party from 4 pm-6 pm by interacting with the PSN through a user device. As part of the volunteer request, the host could create three people requests and two item requests in the PSN for a volunteer request as follows:

1. People request for "Party setup" from 3-4 pm; Need 3 people.
2. People request for "Help Host" from 4:30-5:30 pm; Need 4 people.
3. People request for "Cleanup" from 6-7 pm; Need 4 people.
4. Item request for "Large veggie Pizzas"; No time mentioned (in this case since the VR itself has a schedule of 4-5 pm, that should be assumed for this request); Need 4 in quantity.
5. Item request for "Ice cream"; Needed at 5 PM; Need 4 in quantity.

There are different types of volunteer request. Examples of different variants of volunteer requests follow. There can be schedule based variants. These apply to both the volunteer request and the individual requests (people or item) within the volunteer request. Volunteer requests can have different schedules, e.g., start and end times, due time, no explicit schedule. Note that a schedule is required at the volunteer request (VR) level to support this scenario. If the VR doesn't have a schedule then every request within it should have a schedule.

VRs without schedule: Ex: Ongoing class supplies wishlist.

Volunteer requests can also have confirmation, e.g., RSVP, based variants. In the birthday party example described above, the host would send the "Class Birthday Party Celebration" invite to the parents of the entire class, e.g., a circle associated with the class, and would include the volunteer requests inside the same invite. She needs to know who all are attending the party and also needs to know who are signing up for the requests. There could be another invite where she specifically doesn't need to know who all are attending but needs to know who all are signing up for the requests within the VR. The PSN can support the following:

VR where RSVP is required at the VR (invite) level.
VR where RSVP is not required at the VR level.
Note that in both cases signups for the requests is needed.

The PSN can also create (e.g., an electronic record that is stored and can be interacted with by parent users with their devices) and publish VR. The PSN can provide a VR template for a host (Teacher, PTA Admin, parent, etc.) to create and publish (invite) a volunteer request (VR). There are two types of request (1) people: Request for help with one or more tasks. Each task can require one or more people and (2) Items: Request for material contributions such as class supplies. The PSN can allow the host should be able to publish and re-publish the VR anytime they want.

The PSN can provide launch points for VR creation. Since a VR is mostly tied to a schedule it needs to be attachable to an event. Following are the launch points to create a VR:

a. As a "Volunteer Help (or Request)" calendar event category: clicking on "Volunteer Help (or Request)"—Default to No RSVP at the VR level; they can change it to RSVP required.

b. As an "Event" or other non VR calendar event category: clicking on "Event" or "Birthday Party" etc.—Starts like a regular event; Default to RSVP required at the VR level; they can change it to RSVP required; They can inject "Volunteer Request" section.

c. Quick access inside a class—only for a teacher and class admin: Need to surface ability for teacher to create a VR more prominently inside a class. Default to No RSVP at the VR level; they can change it to RSVP required.

d. Quick access inside school—only for PTA admin and school admin: Need to surface ability for PTA Admin and School Admin to create a VR more prominently inside a school. Default to No RSVP at the VR level; they can change it to RSVP required.

The PSN can provide various access and respond functions for uses when a VR is created. The servers and processors of the PSN can communicate with the user devices. The PSN can allow parents to respond to VR as follows, in example, a same person can signup for different tasks for the same event, e.g., Party setup and Party cleanup. In an example, parents can not signup for multiple slots on the same task—the parent can signup for only one spot on Party setup. The PSN can provide item functions in the VR, for example, no limit to number of items and quantity for which they can signup. For example, if the same VR has two items: drawing boards (5 qty) and markers (10 qty), the same person can signup for 3 boards and 5 markers, or fewer of each.

The PSN can further provide functions for the parent to "un"volunteer their signups in a VR. Parents should also be able to "un"volunteer their signups. This ability should be doable at the task or item level. For instance if something came up for a parent who has signed up to help for a particular task in an event, and is now unable to fulfill the signup, they should be able to do so. This can be done by a parent through their user device interacting with the server, memory and processors and the parent selecting the un-volunteer option on a VR record.

The PSN can further provide recurring VRs. The parent, who create a VR, e.g., a VR host, can use the PSN to setup a recurring VR. For instance, a teacher should be able to setup a VR asking parents to signup to help her at the technology workshop which occurs every Monday throughout the year excluding holidays. A parent volunteer, e.g., a recipient, should be able to easily signup for multiple dates for a recurring volunteer request.

The PSN can also provide the function of the host parent to send reminders to volunteers of the VR. In an example, the host can sent flags to resend or remind the recipient volunteers. A VR reminder should do at least two things. First, for the parents who haven't signed up, the PSN will send reminder to signup and list or focus on the pending open/available items/tasks. Second, for the parents who have signed up, e.g., for at least one item or task, send a reminder about their signup, which can include the date, time and task. The PSN can also provide an auto-reminder option. The host parent can set reminders in the PSN at the VR event level. An example VR reminder can state "If tasks/items still pending send reminder {xx} days before start". The PSN can set a default reminder to day(s), e.g., to 2 days, before the event day. The PSN can set a reminder email needs to be sent {xx} days before event start to all the recipients as described below in the email notifications section.

The PSN can provide parents the functions to commenting on VR(s). The function of commenting on the VR can be similar to commenting on an event.

The PSN can also provide notifications to parents associated with a VR. Examples of various notifications related to the VRs can include in-app notifications and email notifications. In-app notification can include a VR notification post that can be sent to the recipients. This function can be similar to the event invite, however, an in-app notification should include summary of the VR. In-app notification can include a signup notification post, which can include an aggregated post sent, e.g., since last seen by the parent, only to the host parent notifying them of the signups for the VR. The post should also show the summary of the pending tasks/items. This should include the instance when someone "unvolunteers" as well.

Email notification can be sent to the recipients (parents associated with the VR) whenever the host sends or reminds. Reminder emails should automatically be sent by the PSN to a corresponding email depending on whether the recipient has already signed up or not in the PSN. For the parents who haven't signed up for anything or when the host has the PSN send the email the first time, the email should show the VR details including the list of tasks/items and quantities. When a parent selects, e.g., clicks, on the signup against any of the tasks should deep link to the signup confirmation page detail page within the app. For the parents who have signed up (for at least one item or task), the email should serve as a reminder email about their signup—it should detail the tasks/items they have signed up for along with the specific schedule. The subject of the email should be different between the original invite vs "Reminder:" email.

The PSN can also create and send a signup notification email. Such an email can be similar to a notification post. The PSN can create and send a daily email that shows the summary of the signups and pending tasks/items since the last email was sent to the host parent. Such an email can include the instances when someone "unvolunteers" as well.

Certain systems, apparatus, applications or processes are described herein as including a number of modules, engines or mechanisms. A module or a mechanism may be a unit of distinct functionality that can provide information to, and receive information from, other modules. An engine also may be a unit of distinct functionality that can provide information to, and receive information from, other modules, engines, or mechanisms, which can be regarded as being communicatively coupled. Engines may also initiate communication with input or output devices, and can operate on a resource (e.g., a collection of information). The modules or engines may be implemented as hardware circuitry, optical components, single or multi-processor circuits, memory circuits, software program modules and objects, firmware, and combinations thereof, as appropriate for particular implementations of various embodiments.

Thus, methods and systems for electronic communication management have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The processes, methods, or algorithms disclosed herein may be deliverable to implement by a processing device, controller, computer, which may include any existing programmable electronic control unit or dedicated electronic control unit, or circuitry. Similarly, the processes, methods, or algorithms may be stored as data and instructions executable by circuitry, a processor, a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. It will be recognized that when software instructions are loaded into a controller, processor or circuitry, then such structures are specific, dedicated machines to execute the loaded instructions. Moreover, the term "processor" need not be limited to a single integrated circuit and may be distributed over a plurality of circuits or circuitry that share data, instructions or are in electrical communication with each other.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

We claim:

1. A social parenting system comprising:
a social network machine including at least one of activities, needs, interests or combinations thereof of minors;
a first processor in communication with the social network machine and configured to:
identify at least a first minor and a second minor with a common activity, need, interest or combination thereof;
identify a first parent responsible for the identified first minor;
identify a second parent responsible for the identified second minor;
propose to link the first parent and the second parent while hiding minor identifying information from both the first parent and the second parent;
determine a location, a minor age and a school name for both the first minor and the second minor;
if a match of at least one of the location, the minor age and the school name between the first minor and the second minor, propose, using a view handler at a user device of the first adult, a user device of the second adult, or both, a link between the first adult and the second adult showing the at least one of the location, the minor age and the school name and not show identifying information of either the first minor or the second minor;
select a teacher associated with the first minor and the second minor using a teacher list associated with the school name;
establish a class circle of links with the teacher and a plurality of parents with minors in the class of the teacher; and
publish a list of parents with minors in the class of the teacher without showing any identifying information of the minors so that the plurality of parents can link directly without access to identifying information of the minors; and
generate a circle of linked parents around the location, the minor age, the school name, common activity, need, interest or combination thereof;
select a teacher associated with the first minor and the second minor using a teacher list associated with the school name;
establish a class circle of links with the teacher and a plurality of parents with minors in the class of the teacher; and
publish a list of parents with minors in the class of the teacher without showing any identifying information of the minors so that the plurality of parents can link directly without access to identifying information of the minors; and
the user devices, each with a second processor in communication with the first processor over a network and configured to:
display the proposed link from the first processor,
wherein the user device of the first adult activates the view handler to cause the user device of the first adult to display thereon at least one of the list of parents, the link between the first adult and the second adult, or both,
wherein the user device of the second adult activates the view handler to cause the user device of the second adult to display thereon at least one of the list of parents, the link between the first adult and the second adult, or both.

2. The system of claim 1, wherein the social network machine includes minor identifying information and wherein the first processor is configured to identify the common activity, need, interest or combination thereof with the proposed link.

3. The system of claim 2, wherein the processor is configured to identify different circles of responsible adults for different common activities, needs, interests, combinations thereof and children when an adult is responsible for more than one child.

4. The system of claim 3, wherein the responsible adult includes at least one of a parent, a guardian, a teacher, a coach, a care provider, an activity provider or a school administrator.

5. The system of claim 3, wherein the at least one of activities, needs, interests or combinations thereof of minors includes at least one of a sports team, a classroom, a grade level, a school organization, a school, an address, a daycare center, an activity center, a medical need or a daycare.

6. The system of claim 1, wherein the first processor is configured to link the identified adults on the social network machine upon receiving an approval from the identified adults and configured to feed notices to the linked adults regarding the identified common activity, need, interest or combination thereof.

7. The system of claim 1, wherein the first processor is configured to feed trusted notices to the linked adults regarding the identified common activity, need, interest or combination thereof and wherein the trusted notices are stored in a memory of the social network machine using recommendation of other adults.

8. The system of claim 1, wherein the social network machine communicates with the parents through a home page associated with the parents, email, instant messaging, texting, phone call, or combinations thereof.

9. The system of claim 2, wherein the first processor is configured to identify different circles of responsible adults for schools that connect responsible adults based on their child's classroom.

10. The system of claim 9, wherein the processor is configured to allow the teacher to control access and approval of a responsible adult to the classroom circle.

11. The system of claim 9, wherein the first processor is configured to allow a school administer to control access and approval of a teacher to school related circles.

12. A social parenting system comprising:
a social network machine including at least one of activities, needs, interests or combinations thereof of minors;
a user device installed with a social network view handler, the user device being associated with an adult; and a processor in communication with the social network machine and configured to:
identify at least a first minor and a second minor associated with a first adult and a second adult, respectively;
receive school name attended by the first minor from the user device of the first adult;
determine a location, a minor age and a school name for both the first minor and second minor;
if a match of at least one of the location, the minor age and the school name between the first minor and the second minor, propose, using the view handler at the user device of the first adult, the user device of the second adult, or both, a link between the first adult and the second adult showing the at least one of the location, the minor age and the school name and not show identifying information of either the first minor or the second minor;
select a teacher associated with the first minor and the second minor using a teacher list associated with the school name;
establish a class circle of links with the teacher and a plurality of parents with minors in the class of the teacher; and
publish a list of parents with minors in the class of the teacher without showing any identifying information of the minors so that the plurality of parents can link directly without access to identifying information of the minors;
wherein the user device of the first adult activates the view handler to cause the user device of the first adult to display thereon at least one of the list of parents, the link between the first adult and the second adult, or both, and
wherein the user device of the second adult activates the view handler to cause the user device of the second adult to display thereon at least one of the list of parents, the link between the first adult and the second adult, or both.

13. The system of claim 12, wherein the processor is configured to:
identify different circles of responsible adults for schools that connect responsible adults based on their child's classroom;
allow teacher to control access and approval of a responsible adult to the classroom circle through the view handler and a user device associated with the teacher; and
allow a school administer to control access and approval of a teacher to school related circles through the view handler and a user device associated with the school administer.

14. The system of claim 13, wherein the processor is configured to recommend an activity based on participation in the activity by children in the class circle and send the recommended activity to the user device for display with the user device being electronically connected to the social network machine.

15. The system of claim 14, wherein the processor is configured to display a participation rate of children in the class circle.

16. The system of claim 15, wherein the processor is configured to transmit a personal message from the first adult to the second adult and display the message with the recommended activity and the participation rate.

17. The system of claim 16, wherein the processor is configured to display a first event calendar for the first minor on a first device associated with a first adult and display a second event calendar for the second minor on a second device associated with a first adult.

18. The system of claim 17, wherein the processor is configured to establish an activity circle of links for an activity plurality of parents with minors in an activity and publish an activity list of parents with minors in the activity.

19. The system of claim 18, wherein the processor is configured to establish a personal circle of links for adults in the social network machine with each adult controlling the other adults in their personal circle.

* * * * *